United States Patent
Zhang

(10) Patent No.: US 11,461,880 B2
(45) Date of Patent: Oct. 4, 2022

(54) GENERATING IMAGE MASKS FROM DIGITAL IMAGES UTILIZING COLOR DENSITY ESTIMATION AND DEEP LEARNING MODELS

(71) Applicant: Adobe Inc., San Jose, CA (US)

(72) Inventor: Jianming Zhang, Campbell, CA (US)

(73) Assignee: Adobe Inc., San Jose, CA (US)

( * ) Notice: Subject to any disclaimer, the term of this patent is extended or adjusted under 35 U.S.C. 154(b) by 5 days.

(21) Appl. No.: 17/146,718

(22) Filed: Jan. 12, 2021

(65) Prior Publication Data

US 2022/0222791 A1 Jul. 14, 2022

(51) Int. Cl.
*G06T 5/40* (2006.01)
*G06T 7/194* (2017.01)
*G06T 7/12* (2017.01)
*G06T 5/00* (2006.01)
*G06T 7/11* (2017.01)

(52) U.S. Cl.
CPC ............... *G06T 5/40* (2013.01); *G06T 5/002* (2013.01); *G06T 7/11* (2017.01); *G06T 7/12* (2017.01); *G06T 7/194* (2017.01); *G06T 2207/10024* (2013.01); *G06T 2207/20081* (2013.01); *G06T 2207/20084* (2013.01)

(58) Field of Classification Search
CPC .. G06T 5/40; G06T 7/12; G06T 7/194; G06T 7/11; G06T 5/002; G06T 2207/10024; G06T 2207/20081; G06T 2207/20084
See application file for complete search history.

(56) References Cited

U.S. PATENT DOCUMENTS

| | | | | |
|---|---|---|---|---|
| 10,217,195 | B1* | 2/2019 | Agrawal | G06T 7/11 |
| 2015/0248775 | A1* | 9/2015 | Freeman | G06T 7/194 |
| | | | | 345/589 |
| 2016/0328856 | A1* | 11/2016 | Mannino | G06T 7/73 |
| 2017/0287136 | A1* | 10/2017 | Dsouza | G06T 7/194 |
| 2018/0189935 | A1* | 7/2018 | McHugh | G06T 5/20 |
| 2019/0058859 | A1* | 2/2019 | Price | H04N 13/271 |

(Continued)

OTHER PUBLICATIONS

Kaiming He, Jian Sun, and Xiaoou Tang. Guided image filtering. In European conference on computer vision, pp. 1-14. Springer, 2010.
(Continued)

*Primary Examiner* — David T Welch
(74) *Attorney, Agent, or Firm* — Keller Preece PLLC

(57) ABSTRACT

This disclosure describes methods, non-transitory computer readable storage media, and systems that utilize color density estimation in a blended boundary region of a digital image to generate an image mask. For example, the disclosed system extracts a foreground region, a background region, and a blended boundary region from a digital image. The disclosed system determines a color histogram—within a color space selected utilizing the foreground region and the background region—for a portion of the background region along an edge of the blended boundary region. Additionally, the disclosed system generates a color density map for the blended boundary region by comparing colors in the blended boundary region to colors in the color histogram of the background band. The disclosed system then generates a final mask for the digital image based on the color density map.

20 Claims, 15 Drawing Sheets

(56) References Cited

U.S. PATENT DOCUMENTS

| | | | |
|---|---|---|---|
| 2019/0122404 A1* | 4/2019 | Freeman | G06V 40/171 |
| 2020/0020108 A1* | 1/2020 | Pao | G06V 10/758 |
| 2020/0273152 A1* | 8/2020 | Lin | G06T 5/50 |

OTHER PUBLICATIONS

Guosheng Lin, Anton Milan, Chunhua Shen, and Ian Reid. Refinenet: Multi-path refinement networks for high-resolution semantic segmentation. In Proceedings of the IEEE conference on computer vision and pattern recognition, pp. 1925-1934, 2017.

Anat Levin, Dani Lischinski, and Yair Weiss. A closed-form solution to natural image matting. IEEE transactions on pattern analysis and machine intelligence, 30(2):228-242, 2007.

Ning Xu, Brian Price, Scott Cohen, and Thomas Huang. Deep image matting. In Proceedings of the IEEE Conference on Computer Vision and Pattern Recognition, pp. 2970-2979, 2017.

\* cited by examiner

GENERATING IMAGE MASKS FROM DIGITAL IMAGES UTILIZING COLOR DENSITY ESTIMATION AND DEEP LEARNING MODELS

BACKGROUND

Improvements to computer processing technologies have led to significant advancements in the field of image processing. For example, conventional image processing systems can detect content portrayed within digital images and manipulate the digital images in a variety of computing environments. To illustrate, conventional systems use image processing to generate digital image masks based on content of digital images/video, which can be used to modify digital images/video for photo editing, entertainment (e.g., movies, TV shows, video), advertising media, or augmented/virtual reality environments.

Detecting objects and object boundaries in digital images, however, can be a difficult task for implementing computer systems. Specifically, conventional digital editing systems that utilize object detection to generate image masks for various image/object editing operations lack accuracy. For example, some existing systems generate image masks from a digital image by utilizing edge aware smoothing to automatically detect boundaries between foreground and background objects of an image. The conventional systems that utilize edge aware smoothing to detect boundaries, however, are very sensitive to color noise and color contrast. This sensitivity to noise and contrast can result in fuzzy or smeared boundary details between foreground and background objects.

Additionally, some conventional systems utilize image matting to generate an alpha channel to represent complex visual regions with soft boundaries such as hair or nets. The mask quality output by these conventional systems is very reliant on the color contrast within a digital image. Thus, the conventional systems can produce image masks—and boundaries within the image masks—with substantially varied accuracy based on the contrast in the corresponding digital images. Such conventional systems also typically rely heavily on user input to provide accurate image segmentation (e.g., by requiring user-provided trimap segmentation) to indicate foreground, background, and blended boundary regions.

Furthermore, some conventional systems utilize deep learning models to refine an initial coarse mask of a digital image. While such conventional systems are able to more accurately generate image masks with color noises and color contrast, these conventional systems struggle with accuracy in analyzing objects having complex shapes. For example, conventional systems that utilize deep learning models often fail to accurately generate image masks for objects having small holes or thin portions. Accordingly, deep refinement models are often insufficient by themselves to generate accurate image masks for digital images and can sometimes produce less accurate results than other methods. Thus, the conventional systems also lack flexibility, because the conventional systems are typically useful for only specific image content.

Moreover, due to the foregoing accuracy and flexibility concerns, conventional systems are also inefficient. Indeed, conventional systems often require a significant number of user interface interactions (e.g., selections, revisions, etc.) to generate an accurate image segmentation and/or modified digital image. As a result, conventional systems often suffer from excessive consumption of computer resources (such as processing power and memory) in processing user interactions and generating enhanced digital images.

SUMMARY

This disclosure describes one or more embodiments of methods, non-transitory computer readable media, and systems that solve the foregoing problems (in addition to providing other benefits) by utilizing color density estimation in a blended boundary region of a digital image and deep learning models to generate an image mask. In particular, in one or more embodiments the disclosed systems integrate color density estimation in a deep learning based refinement procedure to significantly improve mask quality for complex scenes portrayed in digital images. For example, the disclosed systems utilize a trimap neural network to extract a foreground region, a background region, and a blended boundary region from a digital image. Moreover, the disclosed systems determine a color histogram—within a color space selected utilizing the foreground region and the background region—for a portion of the background region along an edge of the blended boundary region. Additionally, the disclosed systems generate a color density map for the blended boundary region by comparing colors in the blended boundary region to colors in the color histogram of the background band. The disclosed systems then generate a final mask for the digital image based on the color density map by applying a deep refinement model to the color density map. In this manner, the disclosed systems can improve the accuracy, efficiency, and flexibility of computing systems in generating image masks for modifying digital images.

BRIEF DESCRIPTION OF THE DRAWINGS

The detailed description refers to the drawings briefly described below.

DETAILED DESCRIPTION

Figure 1:
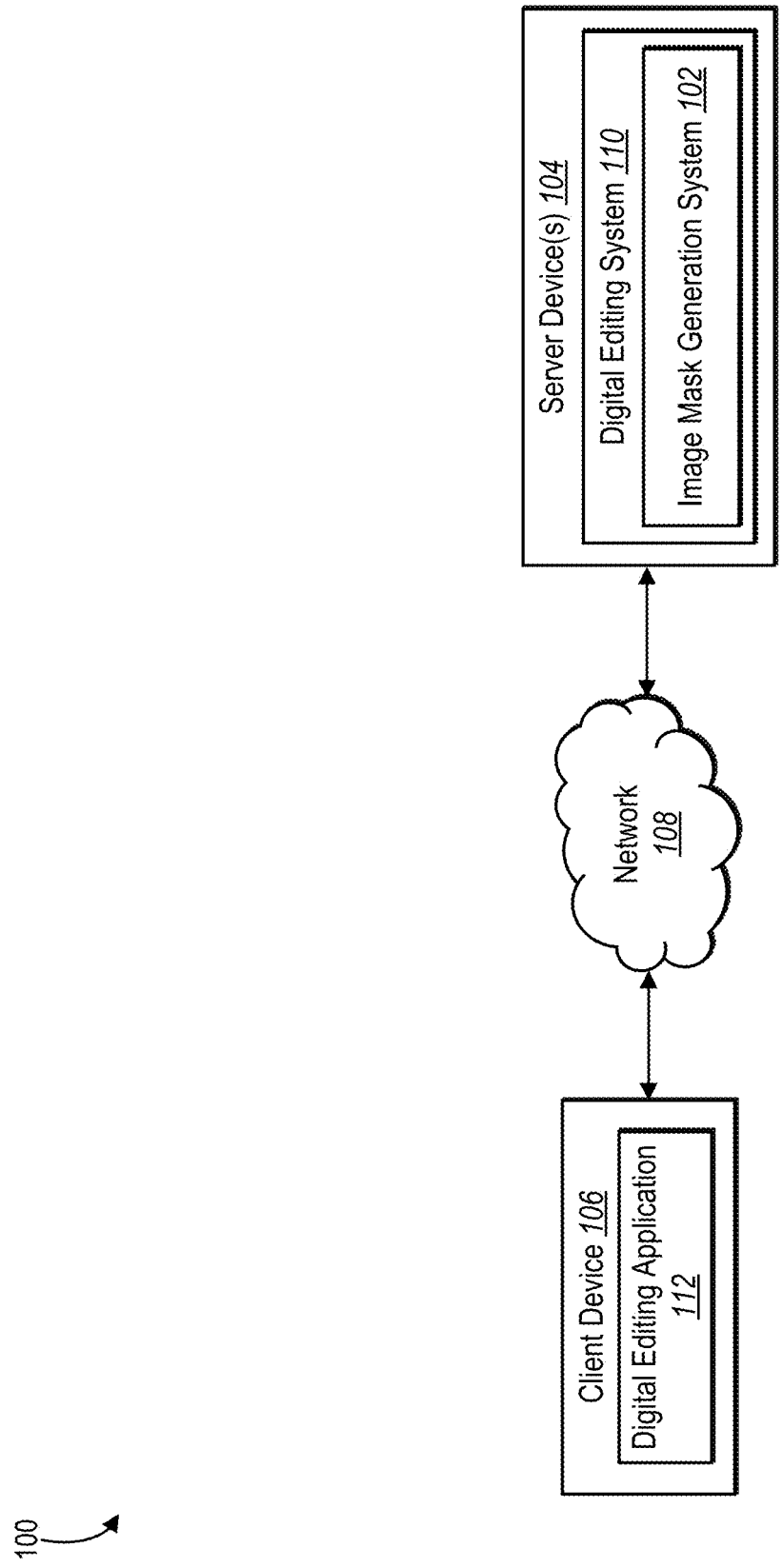
FIG. 1 illustrates a block diagram of a system environment in which an image mask generation system is implemented in accordance with one or more implementations.

This disclosure describes one or more embodiments of an image mask generation system that improves computing systems that generate image masks for digital images by utilizing color density estimation and deep learning models to accurately identify foreground and background elements in complex boundary regions. In particular, in one or more embodiments, the image mask generation system extracts a foreground region, a background region, and a blended boundary region from a digital image (e.g., given an initial coarse mask of the digital image). The image mask generation system also determines portions (e.g., "bands") of the foreground region and the background region near the blended boundary region. Additionally, the image mask generation system utilizes the portions of the foreground region and the background region to determine a color histogram for the portion of the background region. The image mask generation system determines a color density map for the blended boundary region utilizing the color histogram for the portion of the background region. The image mask generation system then generates a final mask for the digital image based on the color density map for the blended boundary region, for example, by refining and upsampling the color density map.

As mentioned, in one or more embodiments the image mask generation system extracts a foreground region, a background region, and a blended boundary region from a digital image. In particular, in one or more embodiments the image mask generation system utilizes an initial mask (e.g., a coarse mask including estimated foreground and background regions) to generate a trimap segmentation of the digital image. For example, the image mask generation system utilizes a trimap neural network to process the coarse mask and digital image to determine the blended boundary region that includes foreground elements and background elements (e.g., region(s) of a digital image including soft or complex boundaries). Accordingly, the image mask generation system splits the digital image into three regions—a foreground region that includes foreground elements, a background region that includes background elements, and a blended boundary region including both foreground and background elements.

Additionally, in one or more embodiments, the image mask generation system determines portions of the foreground region and the background region near the blended boundary region. For example, the image mask generation system determines a foreground band including a portion of the foreground region near the blended boundary region. Similarly, the image mask generation system also determines a background band including a portion of the background region near the blended boundary region. For instance, the image mask generation system determines the foreground/background bands based on an intersection between the blended boundary region and the foreground/background portions from the initial coarse mask.

In one or more embodiments, the image mask generation system also determines a color histogram for one or more portions of the background region along an edge of the blended boundary region. For instance, the image mask generation system first selects a color space for the color histogram by determining color histograms for the foreground band and the background band of the digital image in a plurality of color spaces. The image mask generation system determines a histogram intersection metric for the color histograms of the foreground/background bands in a color space. The image mask generation system then selects the color space that provides color histograms with the lowest histogram intersection metric (i.e., the greatest distance between the respective color histograms).

After determining a color histogram for the portion(s) of the background region along the blended boundary region in the selected color space, in one or more embodiments the image mask generation system generates a color density map for the blended boundary region. In one or more embodiments, the image mask generation system utilizes the color histogram to generate the color density map by comparing the colors in the blended boundary region to the colors in the color histogram. For example, the image mask generation system determines a distance from the colors in the blended boundary region to a background color set from the color histogram. The image mask generation system then converts the distances to similarity values for the pixels in the blended boundary region and generates the color density map based on the similarity values. In one or more embodiments, the image mask generation system also determines a final color density map by looking up similarity values for each pixel in the digital image.

In one or more additional embodiments, the image mask generation system utilizes the color density map to generate a final mask for the digital image. For instance, the image mask generation system utilizes a refinement neural network to refine the color density map by smoothing boundaries in the color density map and removing inaccuracies. Additionally, the image mask generation system utilizes a guided filter to perform edge-aware upsampling of the refined color density map to generate the final mask at an original resolution size of the digital image.

The disclosed image mask generation system can provide a number of technical advantages over conventional systems. For example, the image mask generation system can improve flexibility relative to conventional systems that generate image masks of digital images. To illustrate, in contrast to the previously mentioned conventional systems that are limited in usefulness to digital images with certain content characteristics, the image mask generation system can more flexibly generate high-quality image masks for a variety of digital images by utilizing color density estimation to generate image masks of digital images. Indeed, by determining a color density map for complex boundary regions in digital images, the image mask generation system can more accurately generate image masks for a variety of different digital images with complex boundary regions and varied color noise and color contrast levels.

Additionally, the image mask generation system can improve accuracy relative to conventional systems by integrating color density estimation with deep learning models in the mask generation processes. In particular, in contrast to conventional systems that utilize a single technique to generate an image mask for a digital image, the image mask generation system can more accurately generate an image mask for a digital image by utilizing color distribution density information for areas of the digital image including complex boundaries. The image mask generation system can then utilize the color distribution density information in conjunction with a deep learning refinement model to generate an image mask with improved accuracy in the complex region.

Furthermore, the mask generation system can improve the efficiency relative to conventional systems by automatically generating digital image masks for digital images with high accuracy. As previously mentioned, conventional systems often require excessive interactions via graphical user interfaces. By integrating color density estimation with deep learning models, the image mask generation system automatically generates image masks from digital images while significantly reducing (or eliminating) interactions via graphical user interfaces. Thus, the image mask generation system more efficiently modifies digital images by eliminating a time and computing resources required to generate image masks.

As illustrated by the foregoing discussion, the present disclosure utilizes a variety of terms to describe features and advantages of the image mask generation system. Additional detail is now provided regarding the meaning of such terms. For example, as used herein, the term "digital image" refers to a computer representation of visual content. In one or more embodiments, a digital image includes, but is not limited to, a digital photograph, a digital video frame, a computer-generated image, or a digitally scanned image.

As used herein, the term "foreground region" refers to an area of a digital image that corresponds to one or more objects in a foreground of a digital image. For example, a foreground region corresponds to pixels of a digital image portraying one or more objects nearest to an observer of the digital image. To illustrate, a foreground region corresponds to a visible surface of one or more objects of a digital image nearest to an image capture device that captures the digital image. Alternatively, a foreground region corresponds to a selected object or an object of focus in a digital image.

As used herein, the term "background region" refers an area of a digital image outside of a foreground region. For instance, a background region includes an area visibly farther away from one or more objects associated with a foreground region of a digital image. Thus, a background region includes, but is not limited to, pixels portraying objects and portions of a digital image that are not in focus or that are not closest to an observer of the digital image.

As used herein, the term "image mask" refers to a digital object that identifies foreground and/or background regions of a digital image. For example, an image mask includes a binary image including zero and non-zero values that correspond to portions of a digital image. To illustrate, an image mask includes non-zero values (e.g., displayed as white pixels) to represent a background region of a digital image and zero values (e.g., displayed as black pixels) to represent a foreground region of a digital image. Furthermore, an image mask can include alpha values with numerical values between zero and one indicating at least some transparency for the corresponding pixels of the image mask. In one or more embodiments, a digital editing system utilizes an image mask to apply specific image processes to portions of a digital image without applying the image processes to other portions of the digital image according to the zero and non-zero values assigned to each pixel in the image mask. An image mask can take a variety of forms (in addition to or in the alternative to a binary image) such as a digital matrix, digital array, or a digital boundary that divides foreground or background regions.

As used herein, the term "blended boundary region" refers to a portion of digital image at a boundary between a foreground region and a background region in which the portion includes both foreground elements and background elements. For example, a blended boundary region includes pixels of a digital image that combine foreground and background colors from the digital image. To illustrate, a portion of a digital image that includes hair or fur often includes color pixels that are a blended combination of foreground (e.g., hair or fur color) and background (e.g., the color of the sky in the background). Accordingly, an image mask generated based on a blended boundary region can include an alpha channel with alpha values assigned to pixels within the blended boundary region to indicate an opacity (or blending amount) of each pixel within the blended boundary region.

As used herein, the term "trimap segmentation" refers to a partition of a digital image into a foreground region, a background region, and a blended boundary region. In particular, a trimap segmentation includes a plurality of pixels associated with a defined foreground region that corresponds to a portion of the digital image portraying one or more objects, a plurality of pixels associated with a defined background region corresponding to a portion of the digital image outside the one or more objects, and a plurality of pixels associated with a portion of the digital image that includes both foreground and background elements. Thus, a trimap segmentation includes a visualization of each region using different colors or display values such as black (e.g., for a background region), white (e.g., for a foreground region), and gray (e.g., for a blended boundary region). In one or more embodiments, a trimap segmentation includes a representation of a blended boundary region separate from a representation of a foreground region and a background region. For instance, a trimap segmentation can alternatively include a representation of the blended boundary region separate from an initial mask including foreground and background regions. Additionally, a trimap segmentation may be based on an initial mask.

As used herein, the terms "initial mask" and "coarse mask" refer to an image mask generated for a digital image including estimated foreground and background regions (e.g., a first or preliminary mask). For example, an initial mask includes an image mask that a deep learning model generates directly from a digital image. In one or more embodiments, an image mask generation system then utilizes the initial mask to generate a final mask (e.g., via color density estimation of a blended boundary region).

Additionally, as used herein, the term "final mask" refers to an image mask generated for a digital image (e.g., at the end of an image mask generation process). For example, a final mask includes an image mask generated based on a color density map for a digital image. In one or more embodiments, an image mask generation system generates a final mask from a color density map by utilizing one or more neural networks and/or one or more filtering operations.

As used herein, the terms "neural network" and "deep learning model" refer to a computer representation that can be tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a deep learning model, a convolutional neural network, a recurrent neural network, a generative adversarial neural network, a variational auto-encoder, a feed forward neural network, or a graph neural network. In one or more embodiments, a neural network includes, but is not limited to, a deep learning model to perform object recognition and image cropping/resizing, a trimap neural network to generate trimap segmentations of a digital image, and a refinement neural network to refine a color density map.

As used herein, the term "color histogram" refers to a representation of a distribution of colors in one or more portions of a digital image. For example, a background color histogram includes a representation of a distribution of color values corresponding to pixels within a background region of a digital image. Additionally, a foreground color histogram includes a representation of a distribution of color values corresponding to pixels within a foreground region of a digital image.

As used herein, the term "background color set" refers to a selected group of colors in a background region of a digital image. For instance, a background color set includes a subset of colors within a portion of a background region. In one or more embodiments, the background color set includes colors that satisfy a color prominence threshold. For example, a background color set includes colors included in the top 95% of colors in a color histogram of a portion of a background region (e.g., in a background band). In other embodiments, a background set includes a different percentage of colors in a portion of a background region or color values that have a minimum number of pixels with that color value (or color values within a specific distance of a color value).

As used herein, the term "color space" refers to an organization of colors for representing color values of a digital image. For example, a color space includes a red-green-blue ("RGB") color space in which color values of pixels in a digital image are represented by blending red values, green values, and blue values. In another example, a color space includes a hue-saturation-value ("HSV") or hue-saturation-lightness color space in which color values of pixels in a digital image are represented by blending hue values, saturation values, and lightness values. Example color spaces also include CIE or CMYK color spaces. Furthermore, as used herein, the term "similarity score" for a color space represents a similarity of a color histogram for a foreground region to a color histogram for a background region within the color space.

As used herein, the term "color density map" refers to a representation of a color distribution in a portion of a digital image relative to a color histogram. For example, a color density map for a blended boundary region indicates a distribution of color values in the blended boundary region relative to a color histogram for a background region. Additionally, entries in a color density map include similarity values indicating a similarity between each color pixel value and colors in a color histogram corresponding to a portion of a background region. Accordingly, in one or more embodiments, a similarity value in a color density map is based on a distance between a color value of a pixel and a color set in a color histogram.

As used herein, the term "foreground band" refers to a portion of a foreground region near to a blended boundary region. For example, a foreground band includes a number of pixels within a specified pixel distance of a blended boundary region in a digital image. Additionally, as used herein, the term "background band" refers to a portion of a background region near to a blended boundary region. For instance, a background band includes a number of pixels within a specified pixel distance of a blended boundary region in a digital image.

Turning now to the figures, FIG. 1 includes an embodiment of a system environment 100 in which an image mask generation system 102 (also referred to as a "mask generation system 102") operates. In particular, the system environment 100 includes server device(s) 104 and a client device 106 in communication via a network 108. Moreover, as shown, the server device(s) 104 include a digital editing system 110, which includes the mask generation system 102. Additionally, the client device 106 includes a digital editing application 112.

As shown in FIG. 1, the server device(s) 104 includes or hosts the digital editing system 110. Specifically, the digital editing system 110 includes, or is part of, one or more systems that implement displaying and editing digital content such as digital images in one or more environments. For example, the digital editing system 110 provides tools for viewing, generating, editing, and/or otherwise interacting with digital images. In one or more embodiments, the digital editing system 110 uses the digital images in a variety of applications such as databases of digital media assets, digital video presentations, digital advertisements, virtual or augmented reality environments, or other environments that utilize digital images (including digital video). In one or more embodiments, the digital editing system 110 provides modified digital images to another system such as a system/application at the client device 106 or to a third-party system.

In connection with providing tools for interacting with digital images, the digital editing system 110 utilizes the mask generation system 102 to generate image masks for digital images. For example, the digital editing system 110 obtains a digital image from the client device 106 or from another system (e.g., a database of digital images). The digital editing system 110 then uses the mask generation system 102 to generate an image mask for the digital image based on content in the digital image. After generating the image mask, the digital editing system 110 provides the image mask to the client device 106 (e.g., for display within the digital editing application 112) via the network 108. By automatically generating the image mask using the mask generation system 102, the digital editing system 110 provides tools for quickly and easily applying image editing operations to specific portions of the digital image based on the image mask. For instance, the digital editing system 110 provides tools for automatically identifying and modifying a background portion of a digital image (e.g., identifying and replacing a sky in a photograph with other digital image content).

In one or more embodiments, the mask generation system 102 utilizes one or more neural networks to generate image masks of digital images based on the content of the digital images. For example, the mask generation system 102 utilizes one or more neural networks to generate initial masks and trimap segmentations for the digital images. Additionally, the mask generation system 102 utilizes the trimap segmentations to determine color distribution density information for blended boundary regions of the digital images and generate color density maps. Furthermore, in one or more embodiments, the mask generation system 102 utilizes one or more additional neural networks to process the color density maps and generate final masks for the digital images. The digital editing system 110 can utilize the final masks for the digital images to modify the digital images.

In one or more embodiments, the server device(s) 104 include a variety of computing devices, including those described below with reference to FIG. 10. For example, the server device(s) 104 includes one or more servers for storing and processing data associated with digital images. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

As mentioned, the server device(s) 104 include components associated with neural networks and training data for training one or more neural networks. In one or more embodiments, the server device(s) 104 (e.g., the mask generation system 102 or another system) train neural network layers of the neural network(s). For example, the server device(s) 104 also trains the neural network layers using previously generated or labeled training data such as digital images with labeled boundary regions, objects, trimap segmentations, etc. In addition to utilizing one or more training datasets, the server device(s) 104 can utilize a verification dataset and a testing dataset for verifying and testing training of the neural network layers, respectively.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 10. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., digital images) via the digital editing application 112. The client device 106 also performs functions for generating, capturing, or accessing data to provide to the digital editing system 110 and the mask generation system 102 in connection with digital images and image masks. For example, the client device 106 communicates with the server device(s) 104 via the network 108 to provide information associated with a digital image and to receive an image mask for a digital image. Although FIG. 1 illustrates the system environment 100 with a single client device 106, the system environment 100 can include a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 10.

Although FIG. 1 illustrates the server device(s) 104 and the client device 106 communicating via the network 108, in alternative embodiments, the various components of the mask generation system 102 communicate and/or interact via other methods (e.g., the server device(s) 104 and the client device 106 can communicate directly). Furthermore, although FIG. 1 illustrates the mask generation system 102 being implemented by a particular component and/or device within the system environment 100, the mask generation system 102 can be implemented, in whole or in part, by other computing devices and/or components in the system environment 100 (e.g., the client device 106). Additionally, one or more of the neural networks that the mask generation system 102 utilizes may be implemented at the server device(s) 104 or at one or more other server devices or systems.

Figure 2:
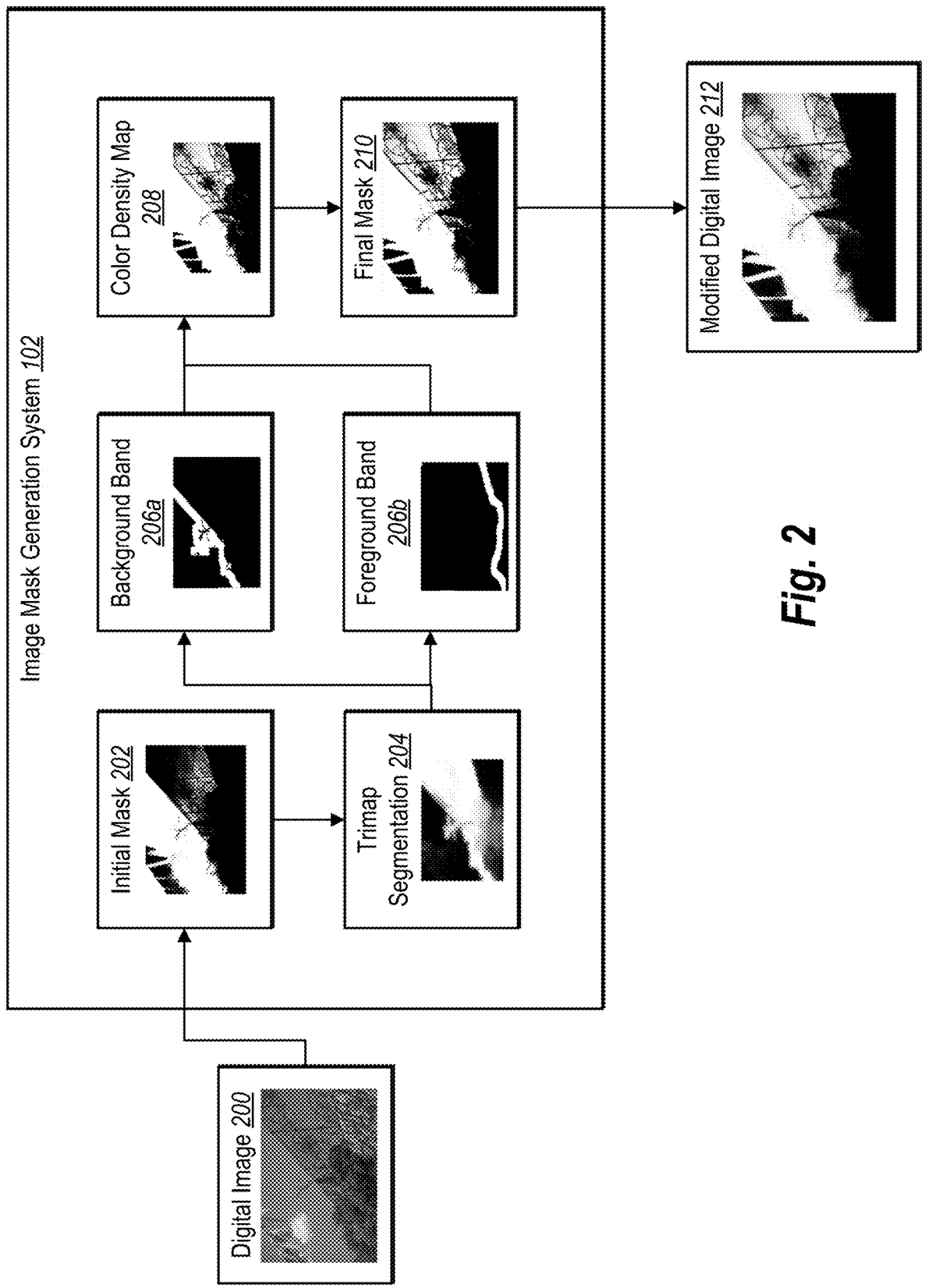
FIG. 2 illustrates an overview diagram of the image mask generation system utilizing color density estimation for generating an image mask of a digital image in accordance with one or more implementations.

As mentioned above, the mask generation system 102 accurately and efficiently generates image masks for digital images by utilizing color density estimation. FIG. 2 illustrates an overview diagram of the image mask generation system 102 ("mask generation system 102") utilizing color density estimation for generating an image mask of a digital image. Specifically, FIG. 2 illustrates that the mask generation system 102 segments a digital image and determines portions of a foreground region and a background region near a blended boundary region. FIG. 2 illustrates that the mask generation system 102 then generates a color density map for the blended boundary region based on the determined portions of the foreground/background regions. Moreover, FIG. 2 illustrates that the mask generation system 102 generates a final mask to utilize in modifying the digital image.

For example, FIG. 2 illustrates that the mask generation system 102 receives (or otherwise identifies) a digital image 200 to generate an image mask. In one or more embodiments, the mask generation system 102 processes the digital image 200 to create an initial mask 202. In at least some instances, mask generation system 102 generates the initial mask 202 to provide a rough initial estimate of foreground and background elements based on detecting one or more objects in the digital image 200. For example, the initial mask 202 includes a coarse mask with an estimated foreground region and an estimated background region.

FIG. 2 illustrates that the mask generation system 102 generates a trimap segmentation 204 in connection with the initial mask 202. Specifically, the mask generation system 102 processes the digital image 200 and/or the initial mask 202 to identify complex regions that may include elements of both foreground objects and background objects. To illustrate, the mask generation system 102 segments the digital image 200 into a plurality of different regions including a foreground region, a background region, and a blended boundary region that includes both foreground elements and background elements. Accordingly, in one or more embodiments, the initial mask 202 and the trimap segmentation 204 include the segmented portions of the digital image 200.

Furthermore, after segmenting the digital image 200 into foreground, background, and blended boundary regions, the mask generation system 102 determines portions of the foreground region and background region near the blended boundary region. In particular, FIG. 2 illustrates that the mask generation system 102 generates a background band 206*a* including a portion of the background region along an edge of the blended boundary region in the trimap segmentation 204. FIG. 2 also illustrates that the mask generation system 102 generates a foreground band 206*b* including a portion of the foreground region along an edge of the blended boundary region.

FIG. 2 also illustrates that the mask generation system 102 generates a color density map 208 for the blended boundary region of the digital image 200. In one or more embodiments, the mask generation system 102 determines color distribution density information for the identified complex boundary region(s) of the digital image 200 relative to colors in the background region. For instance, the mask generation system 102 utilizes color histograms for the background band 206a and the foreground band 206b to generate the color density map for the blended boundary region. In one or more embodiments, the mask generation system 102 generates the color density map 208 for all regions (including the color distribution density information for the blended boundary region) of the digital image 200.

Additionally, FIG. 2 illustrates that the mask generation system 102 generates a final mask 210 for the digital image 200 to use in modifying the digital image 200. For example, the mask generation system 102 utilizes one or more additional processing operations on the color density map 208. In at least some embodiments, the mask generation system 102 processes the color density map 208 to generate the final mask 210 by refining the color density map 208 and/or modifying a resolution of the color density map 208. The mask generation system 102 can then provide the final mask 210 for use in generating a modified digital image 212 (e.g., via the digital editing system 110 of FIG. 1).

Figure 3A:
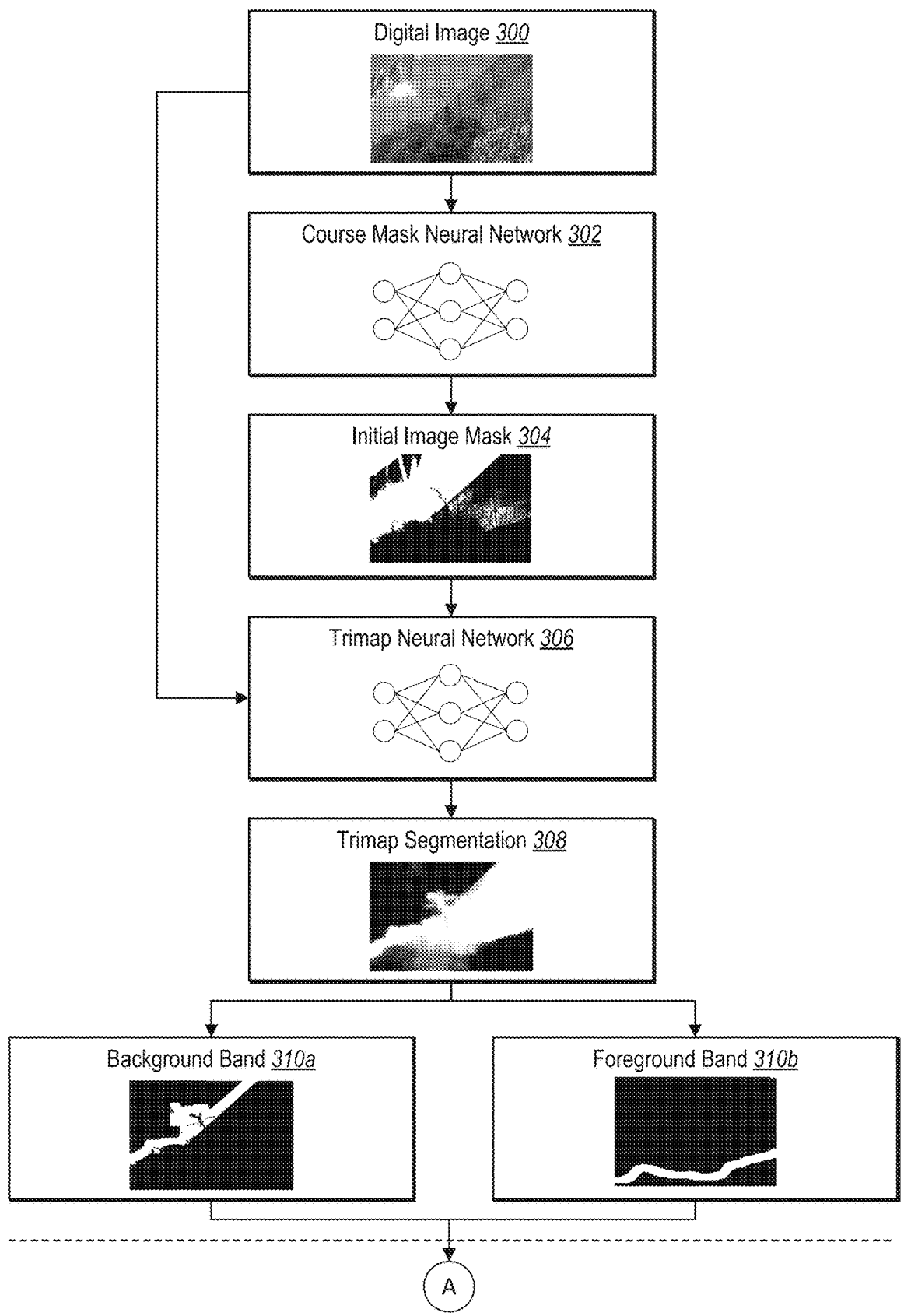
FIGS. 3A-3B illustrate diagrams of the image mask generation system estimating color density in a digital image for generating an image mask in accordance with one or more implementations.
Figure 3B:
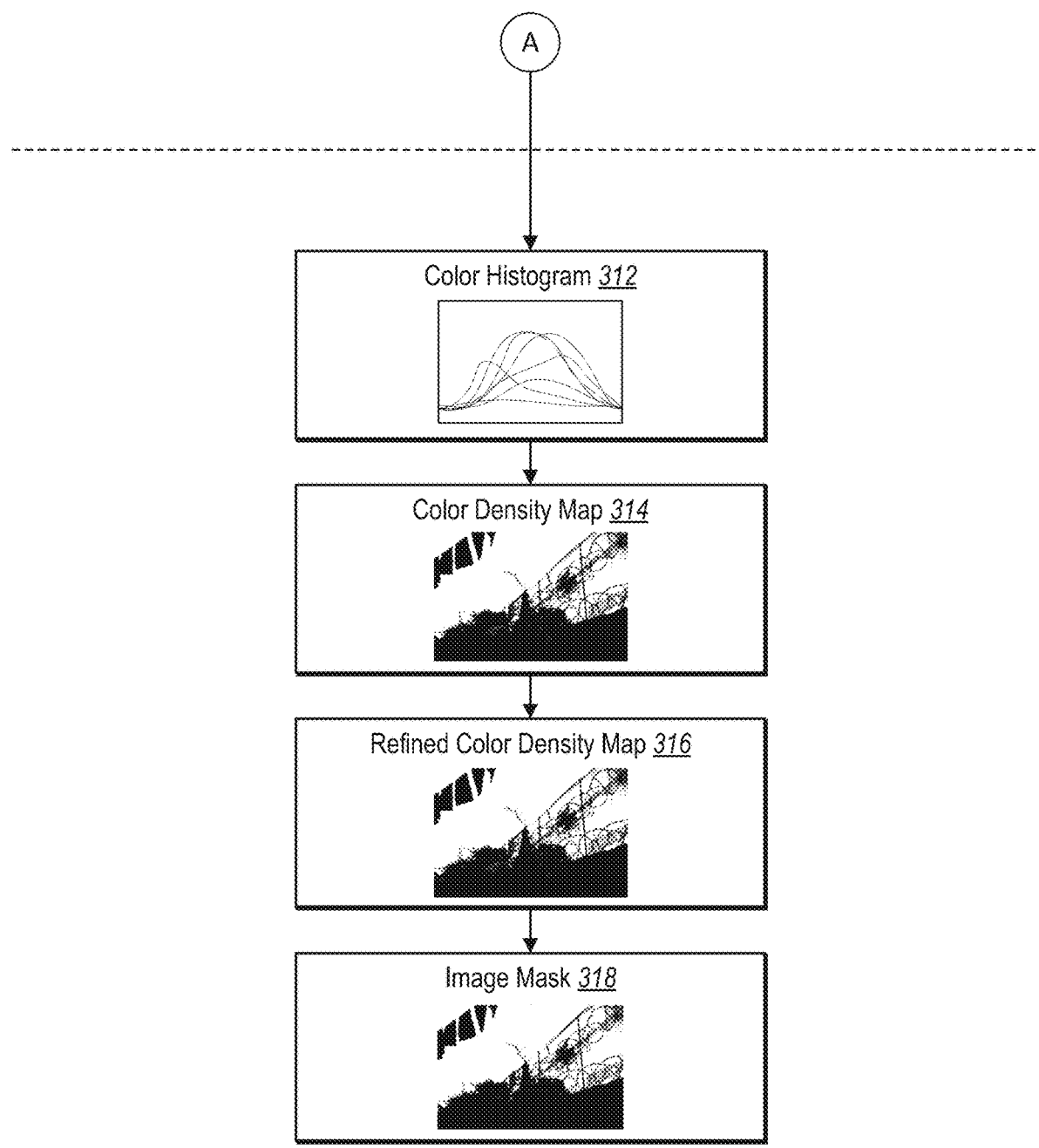

FIGS. 3A-3B illustrate additional detail in a process for generating an image mask of a digital image utilizing color density information. Specifically, FIG. 3A illustrates that the mask generation system 102 segments a digital image into regions and then determines foreground/background portions near a blended boundary region. FIG. 3B illustrates that the mask generation system 102 determines color density information for the blended boundary region and then uses the color density information to generate an image mask.

As illustrated in FIG. 3A, the mask generation system 102 identifies a digital image 300 in connection with a request to generate an image mask for the digital image 300. For example, the mask generation system 102 receives the digital image 300 based on a request to modify one or more portions of digital content within the digital image 300. To illustrate, the mask generation system 102 provides tools for modifying digital images and receives a request (e.g., via a digital editing application) to modify a background region or a foreground region of the digital image. In one or more embodiments, the mask generation system 102 receives a request to digitally and automatically replace a sky in a digital photograph with a different sky design.

As illustrated in FIG. 3A, the mask generation system 102 also utilizes a coarse mask neural network 302 to generate an initial image mask 304. Specifically, the mask generation system 102 generates the initial image mask 304 by providing an initial estimation of foreground and background elements in the digital image. For example, the mask generation system 102 utilizes the coarse mask neural network 302 to process the digital image 300 and determine an estimated foreground region and an estimate background region. In one or more embodiments, the coarse mask neural network 302 includes a deep learning model that automatically detects objects and object boundaries within the digital image 300.

In one or more additional embodiments, the coarse mask neural network 302 generates the initial image mask 304 at a lower resolution than the digital image 300. For instance, the mask generation system 102 reduces the resolution of the digital image 300 from an original resolution to a second resolution lower than the original resolution. The mask generation system 102 then utilizes the coarse mask neural network 302 to process the digital image 300 at the second resolution. In at least some implementations, reducing the resolution of the digital image 300 for processing via the coarse mask neural network 302 improves the speed and processing efficiency of the coarse mask neural network 302.

After or otherwise in connection with determining the initial image mask 304, the mask generation system 102 determines a blended boundary region for the digital image 300. For example, FIG. 3A illustrates that the mask generation system 102 utilizes a trimap neural network 306 to generate a trimap segmentation 308 of the digital image 300. In one or more embodiments, the trimap neural network 306 processes the digital image 300 to predict a blended boundary region corresponding to a soft boundary between one or more foreground objects and one or more background objects in the digital image 300. To illustrate, a soft boundary corresponds to a boundary between hair/fur of an animal or person, branches/needles of a tree, netting, fences, or other materials that include small texture details that at least partially blend with a background. In one or more embodiments, the trimap neural network 306 thus outputs a predicted blended boundary region including foreground elements and background elements from the digital image 300. Additionally, the mask generation system 102 can store the blended boundary region in a separate image mask (e.g., a complex region mask) along with the initial image mask 304.

In one or more additional embodiments, the mask generation system 102 (e.g., via the trimap neural network 306) determines a trimap segmentation 308 including separate foreground, background, and blended boundary regions. Specifically, after or otherwise in connection with determining the estimated foreground region and the estimated background region in the initial image mask 304, the mask generation system 102 determines a foreground region and a background region based on the estimated foreground region and the estimated background region, respectively, from the initial image mask 304. In one or more additional embodiments, the mask generation system 102 utilizes the initial image mask 304 and the blended boundary region to determine a foreground region including foreground elements and a background region including background elements with high confidence. To illustrate, the mask generation system 102 utilizes the initial image mask 304 and the predicted blended boundary region to determine a single mask including a trimap segmentation with the foreground region, the background region, and the blended boundary region. In at least some embodiments, the mask generation system 102 determines the foreground region and the background region for portions of the initial image mask 304 outside the blended boundary region. In one or more embodiments, the trimap neural network 306 generates the trimap segmentation by processing the digital image 300 and the initial image mask 304 to determine the separate regions of the digital image 300.

In one or more embodiments, the mask generation system 102 utilizes a trimap generation neural network and coarse mask neural network as described in AUTOMATICALLY GENERATING A TRIMAP SEGMENTATION FOR A DIGITAL IMABE BY UTILIZING A TRIMAP GENERATION NEURAL NETWORK, U.S. application Ser. No. 16/988,036 filed Aug. 7, 2020 to Zhang et al. (hereinafter "Zhang"), which is herein incorporated by reference in its entirety. Specifically, the trimap generation neural network in Zhang estimates foreground/background regions of a digital image by determining portions of a downsampled digital image that belong to the foreground/background regions with high confidence. The trimap generation neural network then generates a predicted blended boundary region by predicting one or more portions of the downsampled digital image that include both foreground and background elements (e.g., based on visual information such as colors and objects).

As further illustrated in FIG. 3A, the mask generation system 102 utilizes the trimap segmentation 308 (e.g., the foreground region, the background region, and the blended boundary region) to determine portions of the foreground and background regions near the blended boundary region. For example, the mask generation system 102 utilizes the trimap segmentation 308 to determine a background band 310a corresponding to the background region and a foreground band 310b corresponding to the foreground region. In one or more embodiments, the mask generation system 102 determines the background band 310a by identifying pixels of the background region that fall within a specific distance along one or more edges of the blended boundary region. Additionally, the mask generation system 102 determines the foreground band 310b by identifying pixels of the foreground region and within a specific distance along one or more additional edges of the blended boundary region.

As mentioned, FIG. 3B illustrates that the mask generation system 102 utilizes color density information to generate a final image mask for the digital image 300. In one or more embodiments, as FIG. 3B illustrates, the mask generation system 102 utilizes the background band 310a and the foreground band 310b to determine a color histogram 312. In particular, the mask generation system 102 determines the color histogram 312 to represent colors in the background band 310a of the background region.

In one or more embodiments, the mask generation system 102 determines the color histogram 312 by selecting a color space for the color histogram. For example, the mask generation system 102 compares colors in the background band 310a to colors in the foreground band 310b to select a color space from a plurality of possible color spaces (e.g., RBG color space, HSV color space). In one or more embodiments, the mask generation system 102 selects the color space that results in the greatest difference (e.g., the least similarity) between the colors in the background band 310a and the colors in the foreground band 310b. The mask generation system 102 then determines the color histogram 312 for pixels in the background region that are within the background band 310a.

FIG. 3B also illustrates that the mask generation system 102 utilizes the color histogram 312 of the background band 310a to generate a color density map 314. Specifically, the mask generation system 102 generates the color density map 314 by comparing color values in the blended boundary region to the color histogram 312 of the background band 310a. For example, the mask generation system 102 determines a similarity of color values of pixels in the blended boundary region to colors in the color histogram 312 and stores corresponding similarity values in the color density map. In one or more alternative embodiments, the mask generation system 102 also performs a lookup for similarity values for each pixel in the digital image 300 to generate the color density map 314 representing the digital image 300.

After generating the color density map 314, FIG. 3B illustrates that the mask generation system 102 further refines the color density map 314 prior to generating an image mask 318 for the digital image 300. For example, the mask generation system 102 generates a refined color density map 316 by smoothing or cleaning up boundaries along foreground/background elements and/or other details in the color density map 314. In one or more embodiments, the mask generation system 102 then generates the image mask 318 from the refined color density map 316. For instance, the mask generation system 102 generates the image mask 318 by upscaling the refined color density map 316 from a lower resolution to an original resolution of the digital image 300.

Figure 4A:
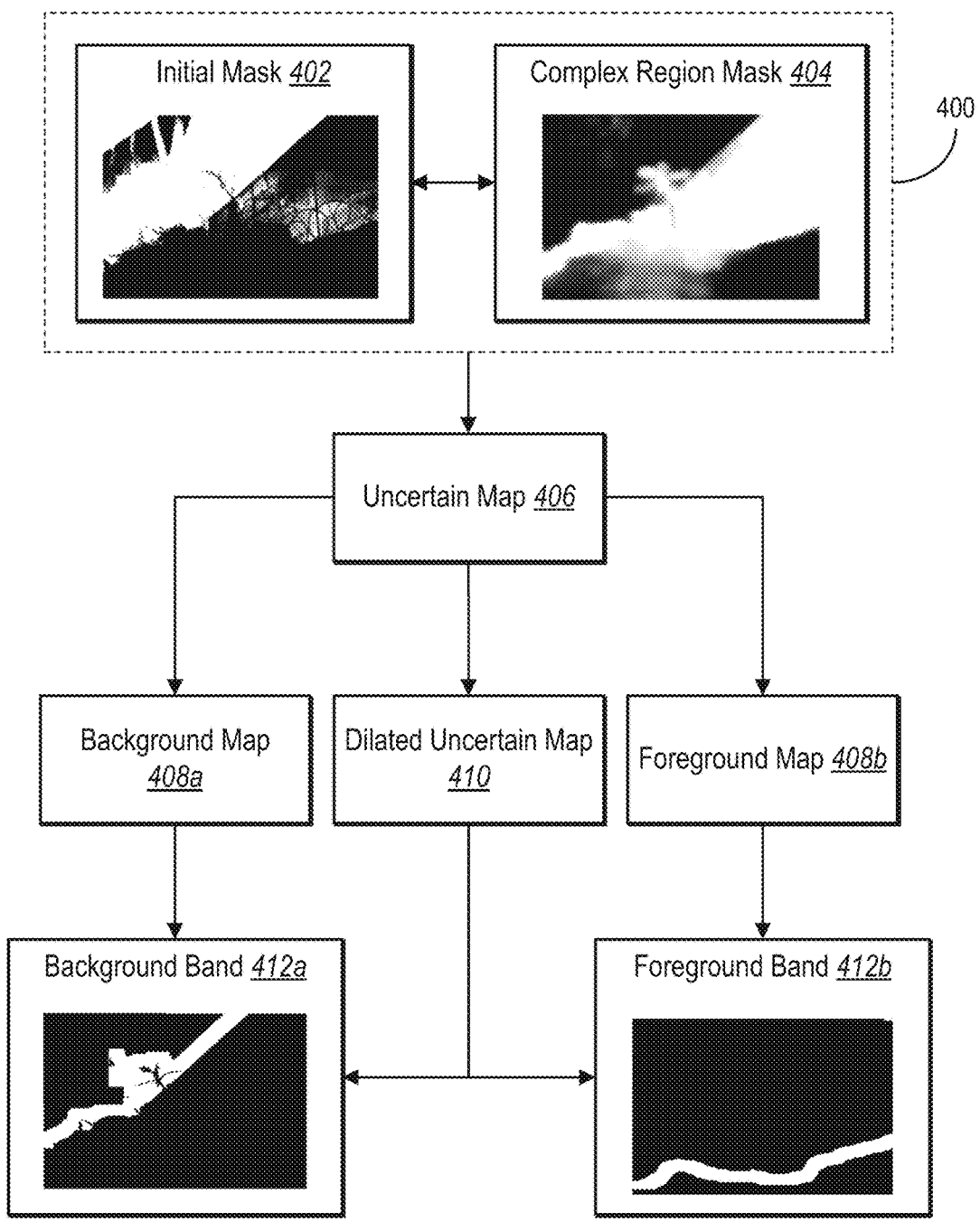
FIGS. 4A-4B illustrate diagrams of the image mask generation system determining a background band and a foreground band and selecting a color space for a digital image in accordance with one or more implementations.
Figure 4B:
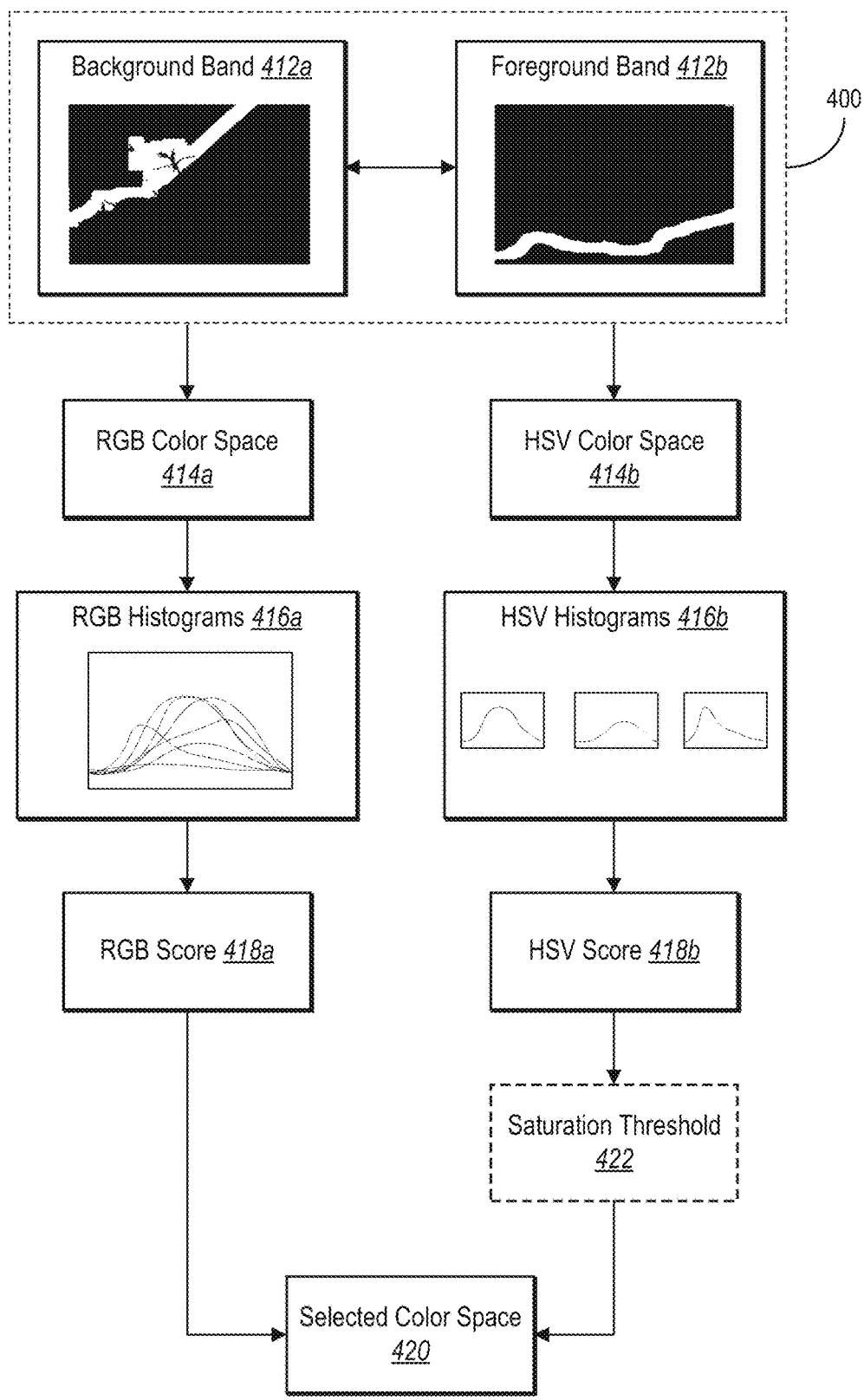

As described previously, the mask generation system 102 determines a color space for a color histogram of a portion of a background region of the digital image. FIG. 4A illustrates that the mask generation system 102 utilizes the trimap segmentation to determine portions of a background region and a foreground region along a blended boundary image of the digital image. FIG. 4B illustrates that the mask generation system 102 utilizes portions of the background region and the foreground region to determine a color histogram for the portion of the background region within a selected color space.

In particular, FIG. 4A illustrates that the mask generation system 102 first determines a trimap segmentation 400 based on an initial mask 402 and a complex region mask 404 for a digital image. In one or more embodiments, the initial mask 402 includes a coarse mask of the digital image including an estimated foreground region and an estimated background region of the digital image. Additionally, the complex region mask 404 includes a blended boundary region of the digital image that includes both foreground elements and background elements within the blended boundary region (e.g., based on complex/fuzzy boundaries between foreground and background objects in the digital image). Accordingly, the trimap segmentation 400 includes the foreground/background region information from the initial mask 402 and the blended boundary region information from the complex region mask 404.

In one or more embodiments, the mask generation system 102 utilizes the initial mask 402 and the complex region mask 404 to determine portions of the foreground and background regions along the blended boundary regions. In particular, FIG. 4A illustrates that the mask generation system 102 first determines an uncertain map 406 from the trimap segmentation 400. For example, the mask generation system 102 determines the uncertain map 406 by performing a threshold operation that determines an intersection of regions in the initial mask 402 and the complex region mask 404. In one or more embodiments, the mask generation system 102 determines the uncertain map 406 as a way to improve the confidence of unknown regions (e.g., the blended boundary region) of the corresponding digital image. To illustrate, the mask generation system 102 compares the initial mask 402 and the complex region mask 404 to determine values in the estimated regions that are not near zero or one (e.g., values that fall between certain predetermined values such as 0.25 and 0.75). The mask generation system 102 determines that such values are more uncertain and includes these values in the uncertain map 406 with the complex regions (e.g., the blended boundary region) in the complex region mask 404.

According to one or more embodiments, the mask generation system 102 utilizes the following uncertain map generation algorithm to determine the uncertain map:

$$\text{uncertain\_map} = ((U > \theta_U) \otimes (C < \theta_C)) \oplus ((C > a_C) \otimes (C < \beta_C))$$

in which U represents the initial mask 402, C represents the complex region mask 404, and $\theta_U$, $\theta_C$, $a_C$, and $\beta_C$ are threshold parameters. Additionally, $\oplus$ represents a pixel-wise OR operation, and $\otimes$ represents a pixel-wise AND operation. Example values for the threshold parameters include $\theta_U = 0.5$, $\theta_C = 0.75$, $a_C = 0.25$, and $\beta_C = 0.75$, though the threshold parameters may have other values depending on the particular implementation. In one or more embodiments, modifying the threshold parameters changes the size and/or shape of the resulting uncertain map 406 according to the specific regions in the initial mask 402 and the complex region mask 404. In one or more additional embodiments, the mask generation system 102 applies post-processing to the uncertain map 406 by utilizing an "opening" morphological operation on the uncertain map 406, which utilizes erosion dilation to smooth out holes or islands in the uncertain map 406.

After determining the uncertain map 406, FIG. 4A illustrates that the mask generation system 102 determines a background map 408a and a foreground map 408b for the digital image. In particular, the mask generation system 102 utilizes the background region from the initial mask 402 and the uncertain map 406 to determine the background map 408a. Furthermore, the mask generation system 102 utilizes the foreground region from the initial mask 402 and the uncertain map 406 to determine the foreground map 408b. For example, the mask generation system 102 separates the background region and the foreground region from the initial mask 402 into separate maps by comparing the initial mask 402 to the uncertain map 406. To illustrate, the mask generation system 102 determines the background map 408a by thresholding the values in the initial mask 402 and subtracting the uncertain map 406 to find pixels likely belonging to the background region. The mask generation system 102 similarly determines the foreground map 408b by thresholding the values in the initial mask 402 and subtracting the uncertain map 406 to find pixels likely belonging to the foreground region.

In one or more embodiments, the mask generation system 102 determines the background map 408a as bg_map=$(C>\beta_C)\ominus$ uncertain_map and the foreground map 408b as fg_map=$(C<a_C)\ominus$uncertain_map, in which bg_map is the background map 408a and fg_map is the foreground map 408b. Additionally, $\ominus$ represents a pixel-wise AND_NOT Boolean operation. Accordingly, in one or more embodiments, the mask generation system 102 determines the background/foreground maps by subtracting the uncertain map 406 from the respective background/foreground regions in the initial mask 402.

FIG. 4A also illustrates that the mask generation system 102 utilizes the background map 408a and the foreground map 408b to determine portions of the background and foreground regions near the blended boundary region. Specifically, FIG. 4A illustrates that the mask generation system 102 generates a dilated uncertain map 410 from the uncertain map 406. For example, the mask generation system 102 generates the dilated uncertain map 410 by performing a dilation operation on the entire uncertain map 406. In one or more embodiments, the mask generation system 102 selects a dilation kernel that dilates details in the uncertain map 406 to determine how much to dilate the uncertain map 406.

After generating the dilated uncertain map 410, FIG. 4A illustrates that the mask generation system 102 determines the background band 412a and the foreground band 412b based on the background map 408a and the foreground map 408b, respectively, relative to the dilated uncertain map 410. For instance, the mask generation system 102 determines the background band 412a by determining an intersection between the background map 408a and the dilated uncertain map 410. Additionally, the mask generation system 102 determines the foreground band 412b by determining an intersection between the foreground map 408b and the dilated uncertain map 410. For example, the mask generation system 102 generates the background band 412a as bg_band=bg_map$\otimes$dilate (uncertain_map) and the foreground band 412b as fg_band=fg_map $\otimes$dilate (uncertain_ map). According to one or more embodiments, increasing a dilation kernel for generating the dilated uncertain map 406 increases the sizes of the background band 412a and the foreground band 412b.

After determining the background band 412a and the foreground band 412b, the mask generation system 102 determines a color histogram for the background band 412a. Specifically, FIG. 4B illustrates that the mask generation system 102 determines a color histogram for the background band 412a within a specific color space. In one or more embodiments, the mask generation system 102 identifies a plurality of color spaces from which the mask generation system 102 can select a color space for determining a color histogram. For example, FIG. 4B illustrates that the mask generation system 102 identifies an RGB color space 414a and an HSV color space 414b.

Additionally, FIG. 4B illustrates that the mask generation system 102 computes color histograms for the background band 412a and the foreground band 412b in each of the color spaces. For instance, as shown, the mask generation system 102 determines RGB histograms 416a for the background band 412a and the foreground band 412b in the RGB color space 414a. Additionally, the mask generation system 102 determines HSV histograms 416b for the background band 412a and the foreground band 412b in the HSV color space 414b.

In one or more embodiments, the mask generation system 102 determines each color histogram by computing a three-dimensional color histogram for the different color values in a corresponding color space. For instance, the mask generation system 102 generates a three-dimensional tensor corresponding to the color channels in the color space for each band of the digital image. In one or more embodiments, the mask generation system 102 utilizes a three-dimensional color histogram operation Hist(I,M) on the digital image in which I represents the three-channel image and M represents a mask (e.g., corresponding to a particular band). The output of Hist(I,M) includes the three-dimensional color histogram.

In one or more additional embodiments, the mask generation system 102 utilizes a three-dimensional Gaussian smoothing operator on a color histogram to improve the color histogram estimation. Furthermore, in some embodiments, the mask generation system 102 utilizes an L1-normalized operator to normalize the entries (e.g., color values) in the color histogram such that the values sum to one. The mask generation system 102 can accordingly utilize the additional operators to modify each color histogram for each band and in each color space.

After computing the color histograms for each color space, the mask generation system 102 determines which color space to use by comparing the color histograms. FIG. 4B illustrates that the mask generation system 102 generates an RGB score 418a representing a similarity between the color histograms of the bands within the RGB color space 414a. FIG. 4B also illustrates that the mask generation system 102 generates an HSV score 418b representing a similarity between the color histograms of the bands within the HSV color space 414b.

In one or more embodiments, the mask generation system 102 compares the histograms by utilizing a histogram intersection metric to determine how each color space separates colors in the background band 412a and the foreground band 412b. In particular, a higher score indicates a lower similarity between the background colors and the foreground colors in the corresponding color space, while a lower score indicates a higher similarity between the background colors and the foreground colors. More specifically, the score allows the mask generation system 102 to determine which color space is better suited to differentiate between foreground elements and background elements within the blended boundary region based on the similarity of the color values in each color space. Accordingly, FIG. 4B illustrates that the mask generation system 102 determines a selected color space 420 for the color histogram of the background band 412a based on the scores.

For example, the mask generation system 102 generates the RGB score 418a as $S_{rgb}$=sum(min(Hist($I_{rgb}$,fg_band), Hist($I_{rgb}$,bg_band))). Additionally, the mask generation system 102 also generates the HSV score 418b as $S_{hsv}$=sum (min(Hist($I_{hsv}$,fg_band), Hist($I_{rgb}$,bg_band))). In one or more embodiments, the min and sum operations are element-wise (thus resulting in a measure of element-wise intersection between the histograms in each color space). As mentioned, a lower score indicates a lower similarity between color histograms in the color space, and thus, better suitability of the color space for the color histogram. For example, if $S_{rgb}$<$S_{hsv}$ (i.e., the RGB score is less than the HSV score), the mask generation system 102 determines the RGB color space 414a for the selected color space 420, and if $S_{rgb}$>$S_{hsv}$ (i.e., the HSV score is less than the RGB score), the mask generation system 102 determines the HSV color space 414b for the selected color space 420.

In one or more additional embodiments, the mask generation system 102 also optionally determines whether a saturation value in the background band 412a within the HSV color space 414b satisfies a saturation threshold 422. For instance, if the average saturation value of colors in the background band 412a are too low (e.g., do not satisfy the saturation threshold 422), selecting the HSV color space 414b can result in unstable color representation in the resulting color histogram. In such cases, the mask generation system 102 can utilize the RGB color space 414a for the color histogram of the background band 412a regardless of the scores for the color spaces. In some embodiments, the mask generation system 102 determines whether the average saturation value of the colors in the background band 412a satisfies the saturation threshold 422 prior to computing the color histograms and/or prior to generating the scores for the color spaces.

Figure 5:
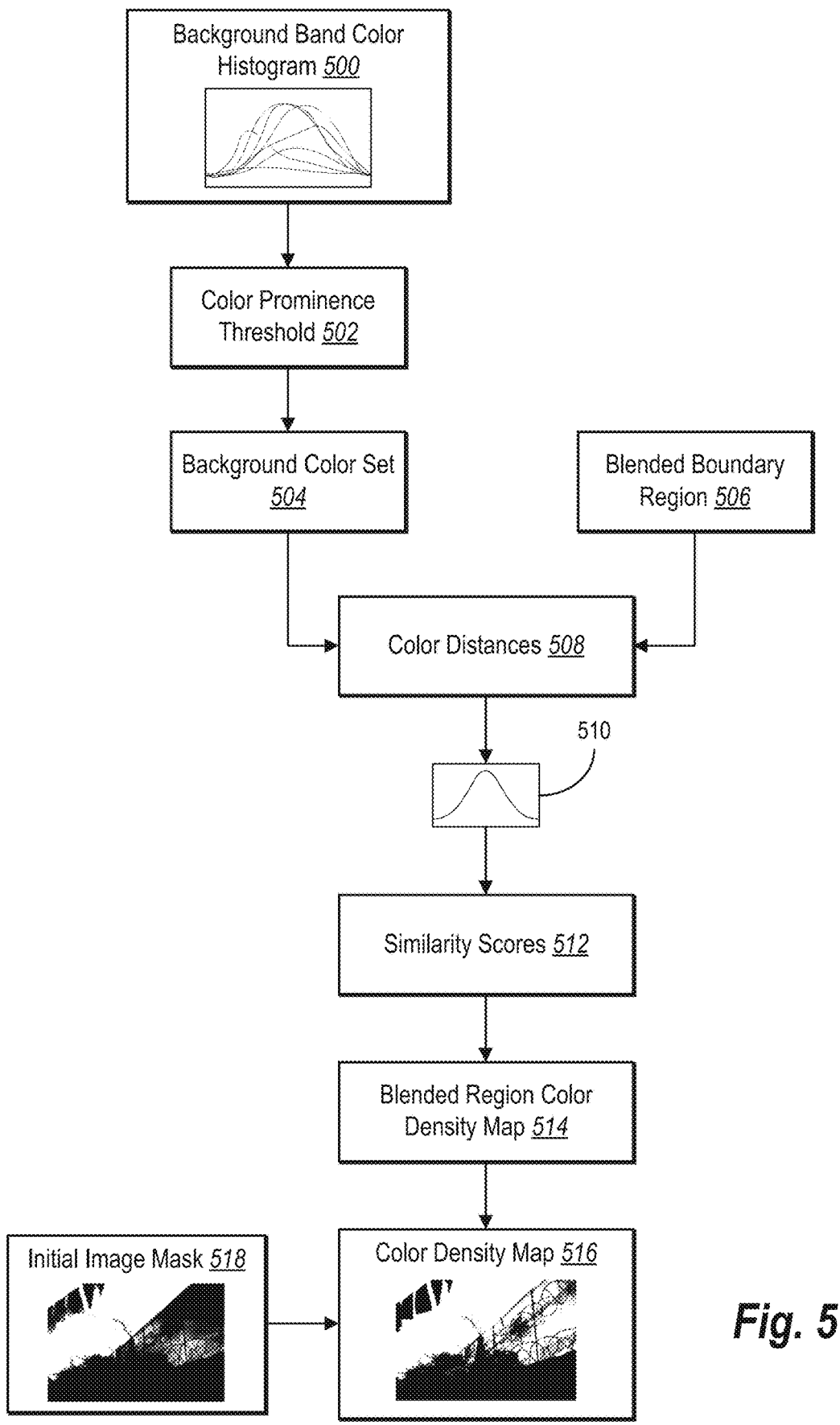
FIG. 5 illustrates a diagram of the image mask generation system generating a color density map for a blended boundary region of a digital image in accordance with one or more implementations.

FIG. 5 illustrates additional detail in connection with utilizing a color histogram to determine color distribution density information for a blended boundary region in a digital image. Specifically, FIG. 5 illustrates that the mask generation system 102 determines a background band color histogram 500 for a background band in a background region of a digital image. For example, as described above with respect to FIG. 4B, the mask generation system 102 determines the background band color histogram 500 in a color space selected from a plurality of color spaces. Accordingly, the mask generation system 102 determines a distribution of color values included in the background band.

As illustrated in FIG. 5, the mask generation system 102 compares the colors in the background band color histogram 500 to a color prominence threshold 502 to generate a background color set 504. For instance, the mask generation system 102 utilizes the color prominence threshold 502 to determine the most prominent colors within the background band. In one or more embodiments, the mask generation system 102 utilizes the color prominence threshold 502 to determine the top 95% of colors (e.g., the color values that occur the most) in the background band color histogram 500. The mask generation system 102 then stores the identified colors in the background color set 504. In alternative embodiments, the mask generation system 102 sets the color prominence threshold to a different percentage (e.g., any x %) of colors for determining colors in the background color set 504.

In one or more additional embodiments, the mask generation system 102 determines color values in the background band color histogram 500 that have a minimum number of occurrences. For example, the mask generation system 102 selects colors that occur at least the minimum number of times for the background color set 504 while excluding colors that do not occur at least the minimum number of times (e.g., by using a minimum color value threshold). In one or more alternative embodiments, the mask generation system 102 groups one or more color values to compare to the minimum color value threshold. Accordingly, the mask generation system 102 can utilize the minimum color value threshold to identify color groups that have a minimum number of occurrences.

After determining the background color set 504 from the background band color histogram 500, the mask generation system 102 determines a similarity between the colors in a blended boundary region 506 of the digital image and the colors in the background band. FIG. 5 illustrates that the mask generation system 102 first utilizes a color distance transform to determine color distances 508 between the blended boundary region 506 and the background color set 504. For example, the mask generation system 102 utilizes the color distance transform to determine a Euclidean distance between color values of pixels in the blended boundary region 506 and colors in the background color set 504 within the selected (three-dimensional) color space.

To illustrate, the mask generation system 102 identifies a color value of a pixel in the blended boundary region 506 within the selected color space (e.g., RGB value). The mask generation system 102 then compares this value to the background color set 504. For example, the mask generation systems 102 determines how close the color value is to a value (e.g., the nearest color value or another color value) within the background color set 504. Accordingly, the distance between the color value of the pixel and the color values in the background color set 504 is a Euclidean distance within a (three-dimensional) color space. The mask generation system 102 also determines the color distances 508 for a plurality of pixels in the blended boundary region 506.

In one or more embodiments, once the mask generation system 102 has determined the color distances 508 of the colors in the blended boundary region to the background color set 504, the mask generation system 102 determines the similarity of the colors to the background color set 504. FIG. 5 illustrates that, in one or more embodiments, the mask generation system 102 utilizes a score generator 510 to transform the color distances 508 to similarity scores 512. For instance, the mask generation system 102 converts the color distances 508 to similarity scores 512 by utilizing a Gaussian kernel as the score generator 510, represented as:

$$S(d) = \exp - \frac{d^2}{2 * \sigma^2}$$

in which d represents a color distance for a pixel and a represents a chosen parameter, with "exp" representing an exponential. In one or more embodiments, the mask generation system 102 generates a similarity score for each color in the blended boundary region relative to the background color set 504. In one or more additional embodiments, the similarity scores 512 represent masking values (e.g., from zero to one).

FIG. 5 further illustrates that the mask generation system 102 generates a blended region color density map 514 from the similarity scores 512. For example, the mask generation system 102 stores the similarity scores 512 in a mapping between the similarity scores 512 and pixels of the blended boundary region 506. Accordingly, the blended region color density map 514 includes the similarity scores 512 for all pixels within the blended boundary region 506 relative to the background color set 504 of the background band.

In one or more embodiments, the mask generation system 102 determines a color density map 516 for the full digital image. For example, the mask generation system 102 utilizes an initial image mask 518 (e.g., a coarse mask) for the digital image with the blended region color density map 514 to complete the color density map 516. To illustrate, the mask generation system 102 generates the color density map 516 by storing the similarity scores 512 from the blended region color density map 514 at positions corresponding to pixels in the blended boundary region 506. Additionally, for pixels outside the blended boundary region, the mask generation system stores values from the initial image mask 518. Thus, the mask generation system 102 can combine the blended region color density map 514 and the initial image mask 518 to generate the color density map 516 for the image.

Figure 6:
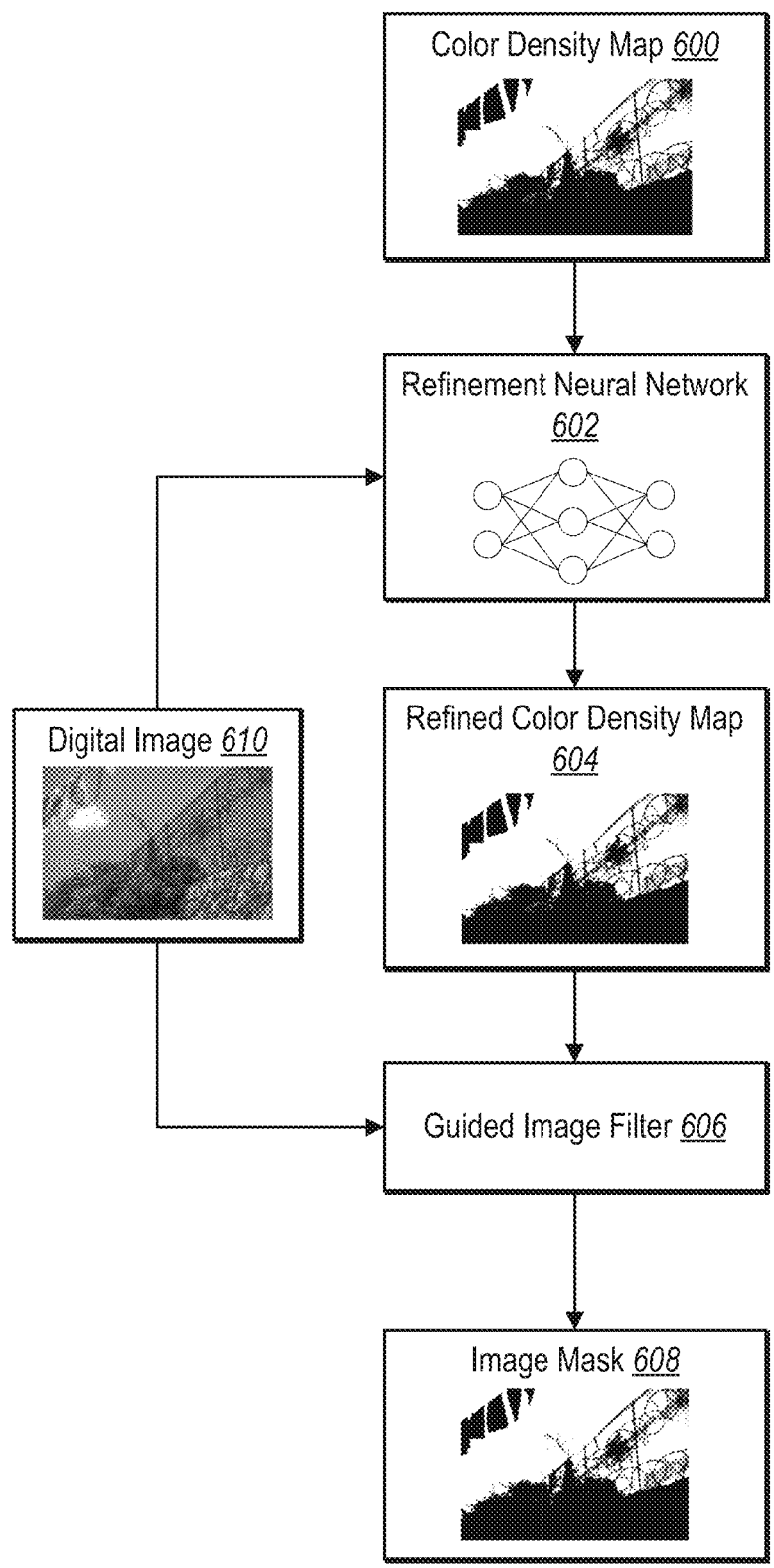
FIG. 6 illustrates a diagram of the image mask generation system generating an image mask utilizing a color density map in accordance with one or more implementations.

FIG. 6 illustrates that the mask generation system 102 utilizes a color density map 600 to generate a final mask for a digital image 610. As mentioned, in one or more embodiments, the mask generation system 102 further processes the color density map 600 to create the final mask. For instance, FIG. 6 illustrates that the mask generation system 102 utilizes a refinement neural network 602 to smooth boundaries and clean up other details in the color density map 600 and generate a refined color density map 604. The mask generation system 102 can utilize a variety of network architectures for the refinement neural network 202. To illustrate, in one or more embodiments the mask generation system 102 utilizes the refinement neural network 602 as described in ENHANCED SEMANTIC SEGMENTATION OF IMAGES, U.S. patent application Ser. No. 16/574,513 filed Sep. 18, 2019. For example, the refinement neural network 602 utilizes an iterative process to refine the color density map 600 based on the digital image 610 (e.g., with the color density map 600 and the digital image 610 as inputs). Specifically, according to one or more embodiments, the refinement neural network 602 corrects at least a portion of type I and type II segmentation errors and refines boundaries of one or more objects within the color density map 600. The refinement neural network 602 improves detail of hard boundary features (e.g., outside the blended boundary region) in the color density map 600 based on pixel information in the digital image 610 to generate the refined color density map 604. In one or more embodiments, the refinement neural network 602 performs the refinement of the color density map 600 at a resolution size lower than an original resolution size of the digital image 610 to reduce computer memory usage.

After generating the refined color density map 604 using the refinement neural network 602, the mask generation system 102 generates an image mask 608 as the final mask for the digital image 610. For instance, FIG. 6 illustrates that the mask generation system 102 upsamples the refined color density map 604 to an original resolution associated with the digital image 610. More specifically, the mask generation system 102 utilizes a guided image filter 606 to enhance details of the refined color density map 604 while upsampling from a lower resolution to a higher resolution. To illustrate, the mask generation system 102 can use a guided image filter as described by Kaiming He, Jian Sun, and Xiaoou Tang in "Guided image filtering" in IEEE transactions on pattern analysis and machine intelligence, 2013 (referred to herein as "Kaiming"). To illustrate, in one or more embodiments, the guided image filter 608 computes a filtering output based on the content of a guidance image (e.g., the digital image 610) to transfer the structures of the guidance image to the filtering output.

In one or more embodiments, the guided image filter 606 utilizes a kernel size determined by $r=\max(\beta, a\min(w,h))$, in which w and h represent the pixel width and height of the digital image 610, respectively. Furthermore, a and $\beta$ are chosen parameters. Additionally, in one or more embodiments, the mask generation system 102 utilizes $a=1/15$ in response to the refinement process being done on a 640×640 map. In one or more embodiments, the mask generation system 102 utilizes $\beta=12$. Alternative embodiments of the mask generation system 102 can utilize other values of a and $\beta$, depending on the input resolutions and desired output resolutions.

As described in relation to FIGS. 2-6, the mask generation system 102 performs operations for utilizing color density estimation to generate image masks for digital images. Accordingly, the mask generation system 102 can accurately generate image masks for digital images that include regions with complex boundaries between foreground and background elements. Accordingly, the acts and operations illustrated and described above in relation to FIGS. 2-5 can provide the corresponding acts (e.g., structure) for a step for generating a color density map for the blended boundary region.

Figure 7A:
FIGS. 7A-7D illustrate a digital image and image masks for the digital image in accordance with one or more implementations.
Figure 7B:
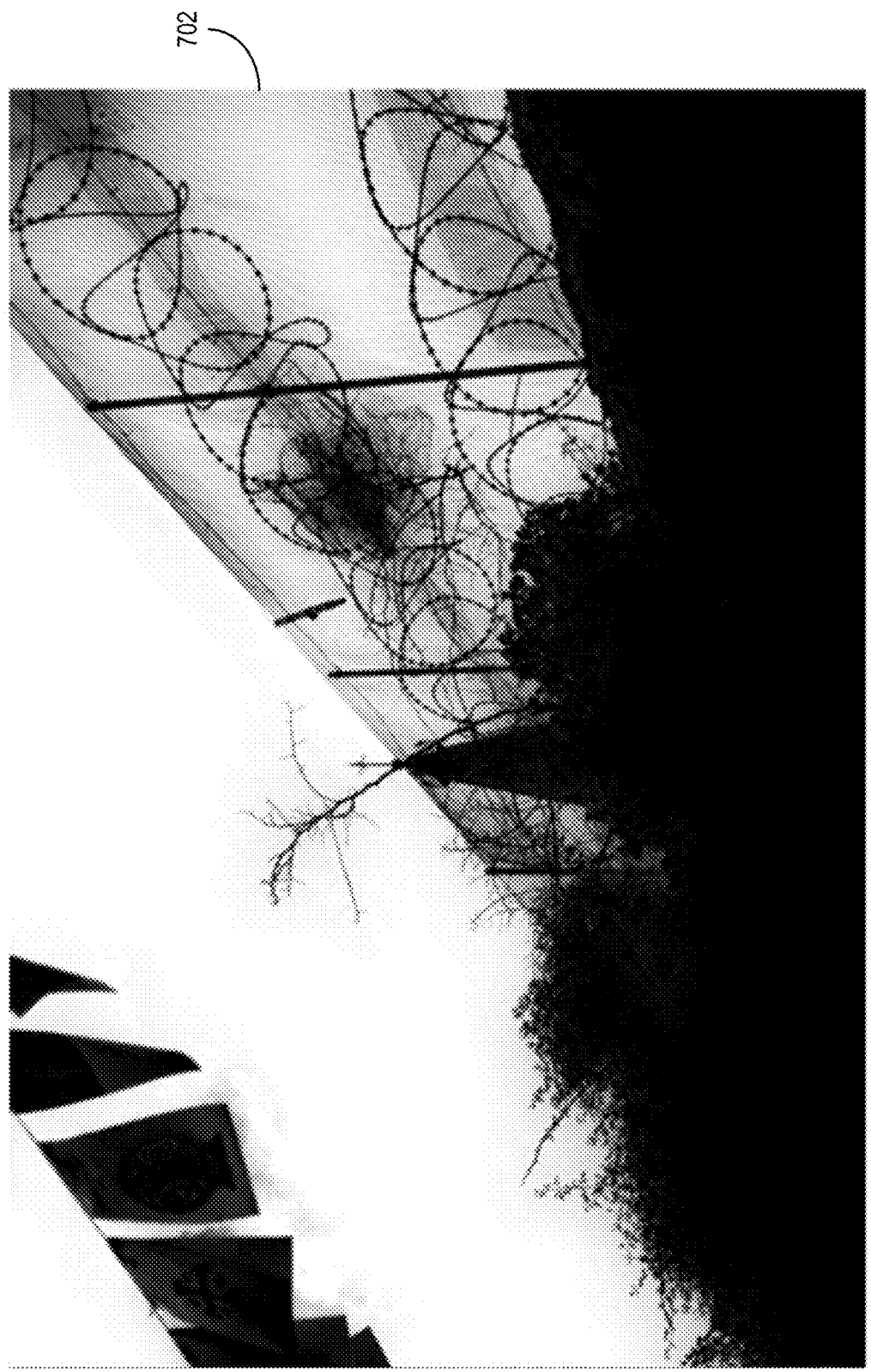

FIGS. 7A-7D illustrate a digital image and a plurality of image masks generated for the digital image utilizing different methods. Specifically, FIG. 7A illustrates a digital image 700 including a plurality of foreground objects (e.g., vegetation, fence, flags) against a background (e.g., a sky). FIG. 7B illustrates a first image mask 702 generated by an example embodiment of the mask generation system 102 for the digital image 700 utilizing color distribution density information for a blended boundary region in the digital image 700. For example, the blended boundary region includes at least some of the vegetation and the fence regions in the digital image 700. As shown, the example embodiment of the mask generation system 102 generates the first image mask 702 that captures fine details in the complex regions with both foreground elements and background elements in the digital image 700.

Figure 7C:
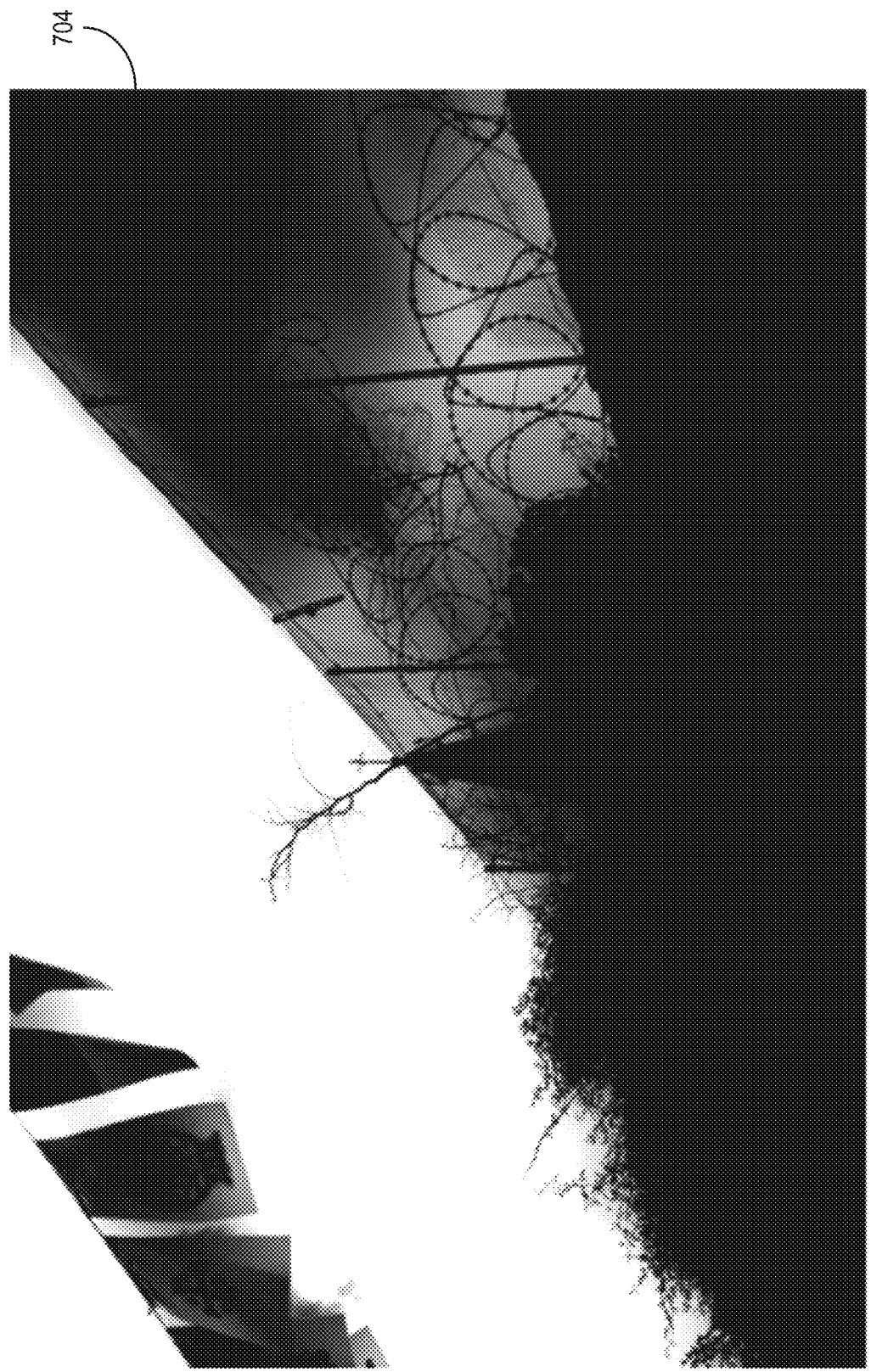
Figure 7D:

FIG. 7C illustrates a second image mask 704 generated utilizing only a guided image filter. As shown, the second image mask 704 includes incorrectly identified foreground and background elements in the complex regions of the digital image 700. Additionally, FIG. 7D illustrates a third image mask 706 generated utilizing only a deep refinement model. The third image mask 706 also includes incorrectly identified foreground and background elements in the complex regions of the digital image 700. As illustrated, the mask generation system 102 can accurately detect different elements in complex boundary regions to improve mask generation over existing systems.

Figure 8:
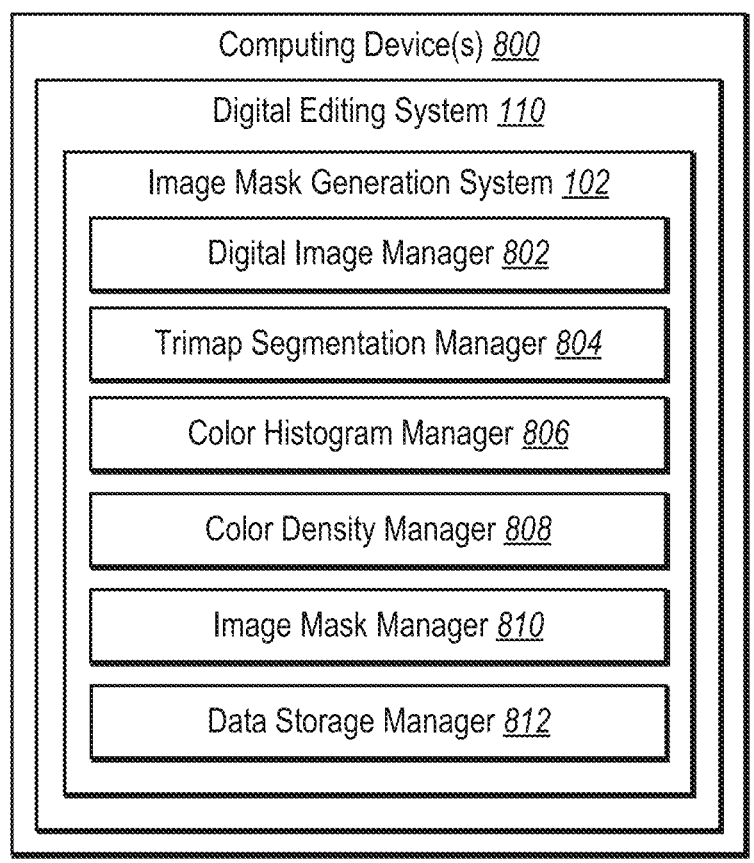
FIG. 8 illustrates a diagram of the image mask generation system of FIG. 1 in accordance with one or more implementations.

FIG. 8 illustrates a detailed schematic diagram of an embodiment of the image mask generation system 102 described above. As shown, the mask generation system 102 is implemented in a digital editing system 110 on computing device(s) 800 (e.g., a client device and/or server device as described in FIG. 1, and as further described below in relation to FIG. 10). Additionally, in one or more embodiments, the mask generation system 102 includes, but is not limited to, a digital image manager 802, a trimap segmentation manager 804, a color histogram manager 806, a color density manager 808, an image mask manager 810, and a data storage manager 812. The mask generation system 102 can be implemented on any number of computing devices. In one or more embodiments, the mask generation system 102 is implemented in a distributed system of server devices for digital content editing. In alternative embodiments, the mask generation system 102 is implemented within one or more additional systems. Alternatively, the mask generation system 102 may be implemented on a single computing device such as a single client device.

In one or more embodiments, each of the components of the mask generation system 102 is in communication with other components using any suitable communication technologies. Additionally, in some embodiments, the components of the mask generation system 102 are in communication with one or more other devices including other computing devices of a user, server devices (e.g., cloud storage devices), licensing servers, or other devices/systems. It will be recognized that although the components of the mask generation system 102 are shown to be separate in FIG. 8, any of the subcomponents may be combined into fewer components, such as into a single component, or divided into more components as may serve a particular implementation. Furthermore, although the components of FIG. 8 are described in connection with the mask generation system 102, in one or more embodiments, at least some of the components for performing operations in conjunction with the mask generation system 102 described herein are implemented on other devices within the environment.

In some embodiments, the components of the mask generation system 102 include software, hardware, or both. For example, the components of the mask generation system 102 include one or more instructions stored on a computer-readable storage medium and executable by processors of one or more computing devices (e.g., the computing device (s) 800). When executed by the one or more processors, the computer-executable instructions of the mask generation system 102 can cause the computing device(s) 800 to perform the mask generation operations described herein. Alternatively, the components of the mask generation system 102 can include hardware, such as a special purpose processing device to perform a certain function or group of functions. Additionally, or alternatively, the components of the mask generation system 102 can include a combination of computer-executable instructions and hardware.

Furthermore, the components of the mask generation system 102 performing the functions described herein with respect to the mask generation system 102 may, for example, be implemented as part of a stand-alone application, as a module of an application, as a plug-in for applications, as a library function or functions that may be called by other applications, and/or as a cloud-computing model. Thus, the components of the mask generation system 102 may be implemented as part of a stand-alone application on a personal computing device or a mobile device. Alternatively, or additionally, the components of the mask generation system 102 may be implemented in any application that provides three-dimensional image rendering, including, but not limited to ADOBE® PHOTOSHOP®, LIGHTROOM® or CREATIVE CLOUD® software. "ADOBE", "PHOTOSHOP," "LIGHTROOM," AND "CREATIVE CLOUD" are either registered trademarks or trademarks of Adobe Inc. in the United States and/or other countries.

As described above, in some embodiments, the mask generation system 102 includes a digital image manager 802. For example, the digital image manager 802 receives or otherwise identifies digital images for utilizing image masks to modify the digital images. In one or more embodiments, the digital image manager 802 identifies individual video frames of a digital video. Furthermore, the mask generation system 102 manages layers of digital images in connection with editing the digital images, including mask layers generated by the mask generation system 102.

In one or more embodiments, the mask generation system 102 also includes a trimap segmentation manager 804. The trimap segmentation manager 804 includes a trimap neural network to predict blended boundary regions corresponding to complex boundaries (e.g., regions that include both foreground elements and background elements) in digital images. The trimap segmentation manager 804 utilizes the predicted blended boundary regions and estimated foreground/background regions from coarse masks to determine trimap segmentations. In some embodiments, the trimap segmentation manager 804 also determines portions of foreground/background regions near blended boundary regions (e.g., foreground/background bands).

The mask generation system 102 also includes a color histogram manager 806 to determine color histograms of different regions of a digital image. For example, the color histogram manager 806 determines a color histogram for a background band in a background region of a digital image. In one or more embodiments, the color histogram manager 806 also selects a color space for determining a color histogram by comparing color histograms of foreground/background regions. Additionally, the color histogram manager 806 determines a set of prominent colors from a color histogram utilizing a color prominence threshold.

Additionally, the mask generation system 102 includes a color density manager 808 to perform color density estimation for blended boundary regions of digital images. For instance, the color density manager 808 compares colors in a blended boundary region to a color histogram for a background band for the digital image, e.g., by determining color distances. The color density manager 808 generates similarity scores for the colors in the blended boundary region by converting the color distances to the similarity scores. The color density manager 808 also generates a color density map for the blended boundary region based on the similarity scores.

Furthermore, the mask generation system 102 includes an image mask manager 810 to generate image masks for digital images based on color density information. In one or more embodiments, the image mask manager 810 generates an image mask for a digital image by refining and upsampling a color density map for the digital image. For example, the image mask manager 810 generates a final mask for the digital image by utilizing a refinement neural network to refine the color density map and a guided image filter to upsample the refined color density map. In one or more additional embodiments, the image mask manager 810 also includes a deep learning model to generate initial masks (e.g., coarse masks) for digital images prior to color density estimation.

Additionally, the mask generation system 102 also includes a data storage manager 812 (that comprises a non-transitory computer memory/one or more memory devices) that stores and maintains data associated with generating image masks. For example, the data storage manager 812 stores one or more neural networks (e.g., a deep learning model, a trimap neural network, a refinement neural network). The data storage manager 812 also stores information associated with digital images, modified digital images, training datasets, trimap segmentations, color histograms, color density maps, and image masks.

Figure 9:
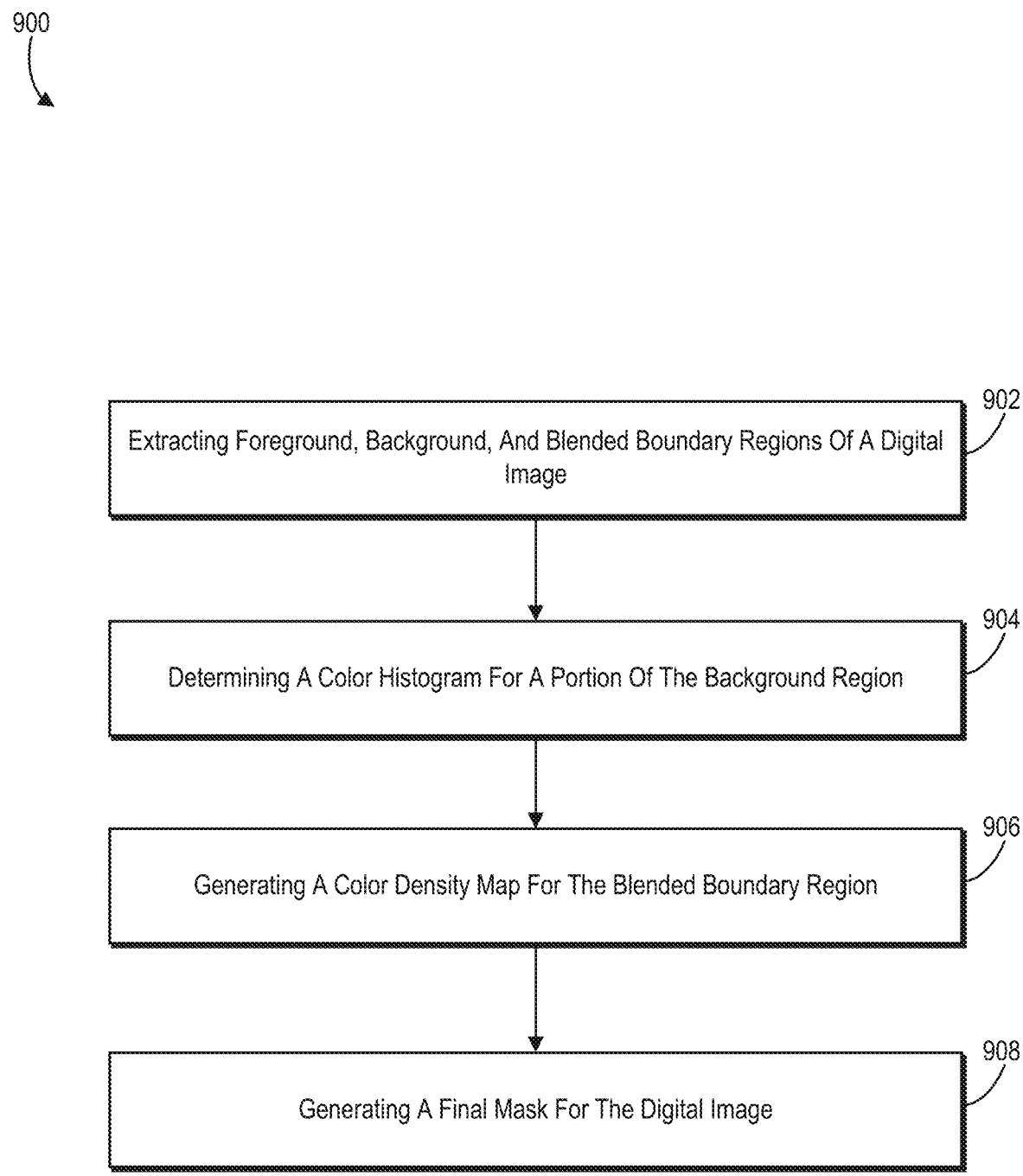
FIG. 9 illustrates a flowchart of a series of acts for utilizing color density estimation to generate an image mask of a digital image in accordance with one or more implementations.

Turning now to FIG. 9, this figure shows a flowchart of a series of acts 900 of utilizing color density estimation to generate image masks for digital images. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

As shown, the series of acts 900 includes an act 902 of extracting foreground, background, and blended boundary regions of a digital image. For example, act 902 involves extracting, from a digital image, a foreground region, a background region, and a blended boundary region that comprises a combination of foreground elements and background elements of the digital image. For instance, act 902 can involve extracting a trimap segmentation comprising the foreground region, the background region, and the blended boundary region.

Act 902 can involve extracting, utilizing an initial mask of the digital image, the foreground region, the background region, and the blended boundary region. Act 902 can involve generating the initial mask of the digital image by generating an estimated foreground region and an estimated background region in the digital image. Act 902 can then involve extracting the foreground region from the estimated foreground region of the initial mask and extracting the background region from the estimated background region of the initial mask. Act 902 can also involve extracting the blended boundary region from the digital image by determining one or more portions of the digital image comprising a combination of foreground elements and background elements.

The series of acts 900 also includes an act 904 of determining a color histogram for a portion of the background region. For example, act 904 involves determining a color histogram for a portion of the background region along an edge of the blended boundary region.

Act 904 can involve determining a background band comprising pixels within the background region and within a first pre-set distance of one or more edges of the blended boundary region. For example, act 904 can involve determining a background band comprising a first set of pixels within the background region and within a first number of pixels of one or more first edges of the blended boundary region. Act 904 can then involve determining the color histogram from colors of the pixels in the background band.

In one or more embodiments, act 904 involves determining a foreground band comprising pixels within the foreground region within a second pre-set distance of one or more additional edges of the blended boundary region. For example, act 904 can involve determining a foreground band comprising a second set of pixels within the foreground region and within a second number of pixels of one or more second edges of the blended boundary region.

Act 904 can also involve selecting a color space for the color histogram by comparing the background band to the foreground band in a plurality of color spaces. For example, act 904 can involve generating similarity scores for a plurality of color spaces by comparing the foreground band to the background band in the plurality of color spaces. Act 904 can involve generating similarity scores for the plurality of color spaces by determining a difference between a foreground color histogram associated with the foreground band and a background color histogram within each color space of the plurality of color spaces. For example, act 904 can involve generating a similarity score of the similarity scores by determining a histogram intersection metric for a foreground histogram of the foreground band and background histogram of the background band. Act 904 can then involve selecting, from the plurality of color spaces, a color space for the color histogram by comparing the similarity scores. For example, act 904 can involve selecting, from the plurality of color spaces, a color space for the color histogram comprising a lowest similarity score.

Act 904 can also involve determining that a saturation value in a hue-saturation-value color space is below a saturation threshold. Act 904 can then involve selecting, in response to the saturation value being below the saturation threshold, a red-green-blue color space as the color space for the color histogram.

Additionally, the series of acts 900 includes an act 906 of generating a color density map for the blended boundary region. For example, act 906 involves generating a color density map for the blended boundary region utilizing the color histogram for the portion of the background region.

Act 906 can involve determining a background color set for the background region from the color histogram of the portion of the background region. For example, act 906 can involve sorting entries of the color histogram by color values of pixels within the background region. Act 906 can then involve selecting a subset of entries or color values of the color histogram that satisfy a color prominence threshold. Act 906 can then involve determining color distances between pixels in the blended boundary region and the background color set. Additionally, act 906 can involve generating similarity values of the color density map by utilizing a Gaussian kernel to transform the color distances to the similarity values.

The series of acts 900 further includes an act 908 of generating a final mask for the digital image. For example, act 908 involves generating a final mask for the digital image based on the color density map for the blended boundary region. Act 908 can involve determining a final color density map by combining the color density map for the blended boundary region with one or more portions of the initial mask of the digital image outside the blended boundary region. Act 908 can then involve generating the final mask utilizing the final color density map.

In one or more embodiments, act 908 involves refining, utilizing a neural network, the final color density map at a refinement resolution size lower than an original resolution size of the digital image. For example, act 908 can involve refining the color density map by smoothing edges in the color density map utilizing a neural network. Act 908 can also involve generating the final mask by upsampling the color density map to the original resolution size utilizing a guided image filter.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
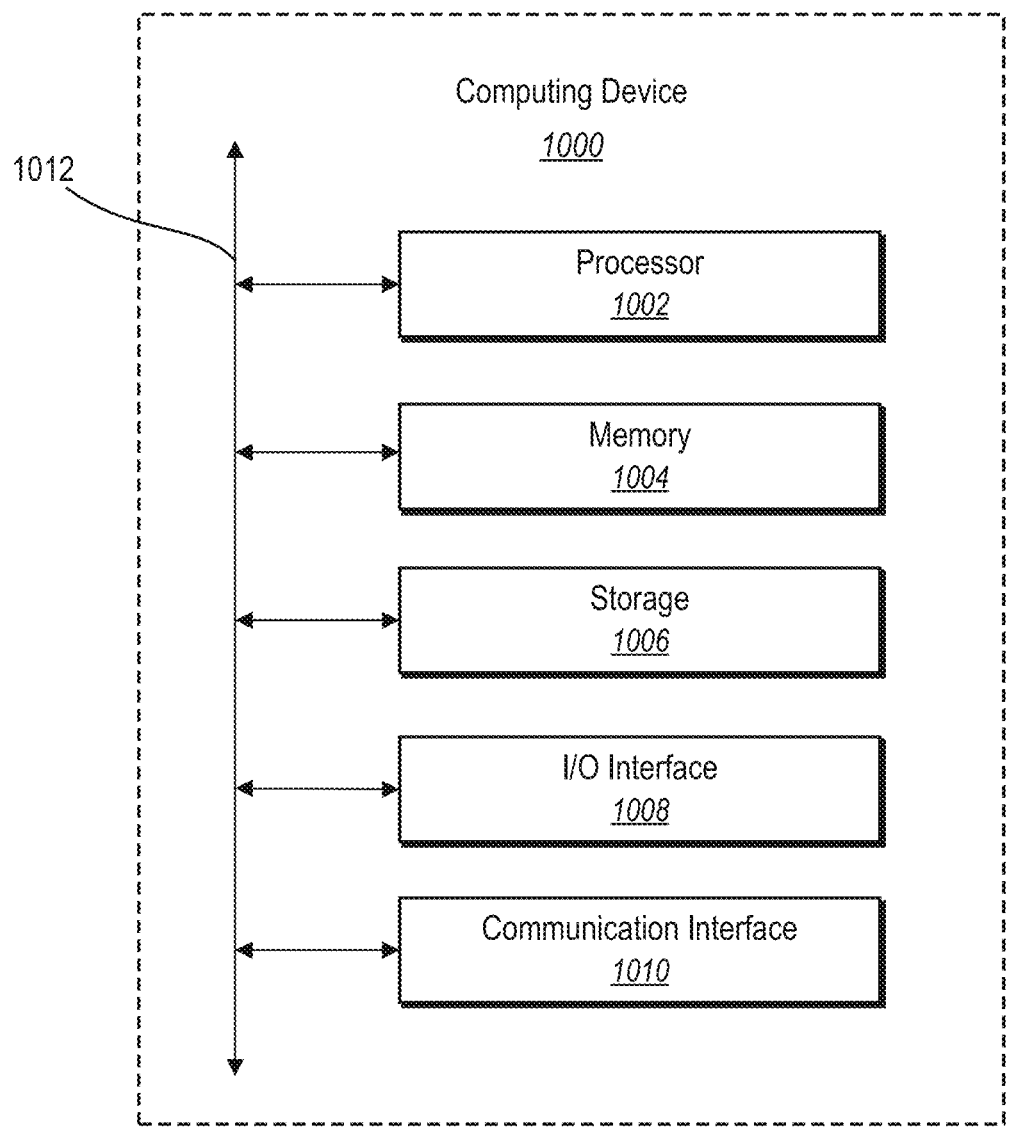
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the system(s) of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   extract, from a digital image, an initial mask comprising a foreground region and a background region and a complex region mask comprising a blended boundary region that comprises a combination of foreground elements and background elements of the digital image;
   determine an uncertain map by determining an intersection of the initial mask and the complex region mask according to a set of threshold parameters;
   determine a background band comprising a set of pixels within the background region along an edge of the blended boundary region by subtracting the uncertain map from the background region in the initial mask;
   determine a color histogram for the background band of the background region;
   generate a color density map for the blended boundary region utilizing the color histogram of the background band of the background region; and
   generate a final mask for the digital image based on the color density map for the blended boundary region.

2. The non-transitory computer readable storage medium as recited in claim 1, further comprising instructions that, when executed by the at least one processor, cause the computing device to determine the background band by:
   determining a background map by subtracting the uncertain map from thresholded values in the background region of the initial mask; and
   determining the background band by subtracting a dilated version of the uncertain map from the background map.

3. The non-transitory computer readable storage medium as recited in claim 1, further comprising instructions that, when executed by the at least one processor, cause the computing device to:
   determine a foreground band comprising pixels within the foreground region within a second pre-set distance of one or more additional edges of the blended boundary region;
   generate similarity scores for a plurality of color spaces by comparing the foreground band to the background band in the plurality of color spaces; and
   select, from the plurality of color spaces, a color space for the color histogram by comparing the similarity scores.

4. The non-transitory computer readable storage medium as recited in claim 3, further comprising instructions that, when executed by the at least one processor, cause the computing device to generate a similarity score of the similarity scores by determining a histogram intersection metric for a color histogram of the foreground band and the color histogram of the background band.

5. The non-transitory computer readable storage medium as recited in claim 1, further comprising instructions that, when executed by the at least one processor, cause the computing device to generate the color density map by:
determining a background color set for the background band by determining a subset of colors from the color histogram of the background band; and
determining color distances between pixels in the blended boundary region and the background color set.

6. The non-transitory computer readable storage medium as recited in claim 5, further comprising instructions that, when executed by the at least one processor, cause the computing device to generate similarity values of the color density map by utilizing a Gaussian kernel to transform the color distances to the similarity values.

7. The non-transitory computer readable storage medium as recited in claim 5, further comprising instructions that, when executed by the at least one processor, cause the computing device to determine the background color set by:
sorting entries of the color histogram by color values of pixels within the background band; and
selecting a subset of entries of the color histogram that satisfy a color prominence threshold.

8. The non-transitory computer readable storage medium as recited in claim 1, further comprising instructions that, when executed by the at least one processor, cause the computing device to generate the final mask by:
determining a final color density map by combining the color density map for the blended boundary region with one or more portions of an initial mask of the digital image outside the blended boundary region; and
generating the final mask utilizing the final color density map.

9. The non-transitory computer readable storage medium as recited in claim 8, further comprising instructions that, when executed by the at least one processor, cause the computing device to generate the final mask utilizing the final color density map by:
refining, utilizing a neural network, the final color density map at a refinement resolution size lower than an original resolution size of the digital image; and
generating the final mask by upsampling the final color density map to the original resolution size utilizing a guided image filter.

10. A system comprising:
at least one computer memory device comprising a digital image; and
one or more servers configured to cause the system to:
extract, from the digital image, an initial mask comprising a foreground region and a background region and a complex region mask comprising a blended boundary region;
determine an uncertain map by determining an intersection of the initial mask and the complex region mask according to a set of threshold parameters;
determine a background band comprising a set of pixels within the background region along an edge of the blended boundary region by subtracting the uncertain map from the background region in the initial mask;
determine a color histogram for the background band of the background region
generate a color density map for the blended boundary region utilizing the color histogram of the background band of the background region by:
determining a background color set for the background band by selecting a subset of colors from the color histogram; and
generating similarity values of the color density map by determining color distances between pixels in the blended boundary region and the background color set of the background band; and
generate a final mask for the digital image based on the color density map for the blended boundary region and the initial mask of the digital image.

11. The system as recited in claim 10, wherein the one or more servers are further configured to cause the system to determine the color histogram by:
determining a foreground band comprising an additional set of pixels within the foreground region and within an additional number of pixels of one or more additional edges of the blended boundary region; and
selecting a color space for the color histogram by comparing the background band to the foreground band in a plurality of color spaces.

12. The system as recited in claim 11, wherein the one or more servers are further configured to cause the system to select the color space for the color histogram by:
generating similarity scores for the plurality of color spaces by determining a difference between a color histogram of the foreground band and the color histogram of the background band within each color space of the plurality of color spaces; and
selecting, from the plurality of color spaces, a color space for the color histogram comprising a lowest similarity score.

13. The system as recited in claim 11, wherein the one or more servers are further configured to cause the system to select the color space for the color histogram by:
determining that a saturation value in a hue-saturation-value color space is below a saturation threshold; and
selecting, in response to the saturation value being below the saturation threshold, a red-green-blue color space as the color space for the color histogram.

14. The system as recited in claim 10, wherein the one or more servers are further configured to cause the system to generate the color density map by:
determining the background color set for the background band by selecting color values from the color histogram that satisfy a color prominence threshold; and
determining color distances between pixels in the blended boundary region and the background color set.

15. The system as recited in claim 14, wherein the one or more servers are further configured to cause the system to generate the color density map by transforming the color distances to similarity values.

16. The system as recited in claim 14, wherein the one or more servers are further configured to cause the system to generate the final mask by:
refining, utilizing a neural network, the color density map at a refinement resolution size lower than an original resolution size of the digital image; and
generate the final mask by upsampling the color density map to the original resolution size utilizing a guided image filter.

17. The system as recited in claim 10, wherein the one or more servers are further configured to cause the system to:
generate the initial mask of the digital image by generating an estimated foreground region and an estimated background region in the digital image;
extract the foreground region from the estimated foreground region of the initial mask;

extract the background region from the estimated background region of the initial mask; and extract the blended boundary region from the complex region mask of the digital image by determining one or more portions of the digital image comprising a combination of foreground elements and background elements.

18. A method comprising:

extracting, for a digital image, an initial mask including a foreground region and a background region and a complex region mask including a blended boundary region that comprises a combination of foreground elements and background elements of the digital image;

determining an uncertain map by determining an intersection of the initial mask and the complex region mask according to a set of threshold parameters;

determining a background band comprising a set of pixels within the background region along an edge of the blended boundary region by subtracting the uncertain map from the background region in the initial mask;

determining a color histogram for the background band of the background region;

generating a color density map for the blended boundary region utilizing the color histogram of the background band of the background region; and generating a final mask for the digital image based on the color density map of the digital image.

19. The method as recited in claim 18, wherein generating the final mask further comprises refining the color density map by smoothing edges in the color density map utilizing a neural network.

20. The method as recited in claim 19, wherein generating the final mask further comprises upsampling the refined color density map utilizing a guided image filter.

* * * * *